(12) United States Patent
Hall et al.

(10) Patent No.: US 7,263,458 B2
(45) Date of Patent: Aug. 28, 2007

(54) TIRE PRESSURE ESTIMATION

(75) Inventors: Peter Hall, Linköping (SE); Tony Gustavsson, Mölndal (SE); Peter Lindskog, Linköping (SE); Fredrik Gustavsson, Molndal (DK); Urban Forssell, Linköping (SE)

(73) Assignee: NIRA Dynamics AB, Linköping (SE)

( * ) Notice: Subject to any disclaimer, the term of this patent is extended or adjusted under 35 U.S.C. 154(b) by 0 days.

(21) Appl. No.: 10/563,524

(22) PCT Filed: Jul. 7, 2003

(86) PCT No.: PCT/EP03/07283

§ 371 (c)(1),
(2), (4) Date: Jun. 6, 2006

(87) PCT Pub. No.: WO2005/005173

PCT Pub. Date: Jan. 20, 2005

(65) Prior Publication Data

US 2007/0061100 A1    Mar. 15, 2007

(51) Int. Cl.
*B60C 23/00* (2006.01)
*B60C 23/02* (2006.01)

(52) U.S. Cl. ............... 702/138; 73/146; 73/146.2; 340/438; 340/442

(58) Field of Classification Search ............ 73/146, 73/146.2, 146.3, 146.4, 146.5, 146.8; 340/438, 340/442, 446, 447, 448, 449; 702/138, 140, 702/141, 142, 145
See application file for complete search history.

(56) References Cited

U.S. PATENT DOCUMENTS

| | | | | |
|---|---|---|---|---|
| 2,417,940 A | * | 3/1947 | Stanley ............... | 200/61.25 |
| 2,727,221 A | * | 12/1955 | Sprigg ............... | 340/447 |
| 2,943,663 A | * | 7/1960 | Antonson ............ | 152/534 |
| 3,786,413 A | * | 1/1974 | Ross et al. .......... | 340/443 |
| 4,630,470 A | * | 12/1986 | Brooke et al. ....... | 73/146.2 |
| 6,218,936 B1 | * | 4/2001 | Imao .................. | 340/447 |
| 6,271,748 B1 | * | 8/2001 | Derbyshire et al. .. | 340/442 |
| 6,963,274 B2 | * | 11/2005 | Saheki et al. ....... | 340/447 |
| 2003/0156022 A1 | * | 8/2003 | Saheki et al. ....... | 340/442 |

(Continued)

FOREIGN PATENT DOCUMENTS

EP    0 925 960 A2 *  6/1999

(Continued)

*Primary Examiner*—Edward Cosimano
(74) *Attorney, Agent, or Firm*—Frost Brown Todd, LLC

(57) ABSTRACT

A method of estimating the occurrence of a specific tire pressure deviation between actual and nominal pressure values for one or a plurality of wheels (i) is provided. One or more wheel radius analysis measurement values ($\Delta R$) are subsequently obtained from a wheel radius analysis component (104), wherein the wheel radius analysis measurement values ($\Delta R$) are related to single wheel radius values ($\Delta r_i$) of which each is indicative of the wheel radius of a particular wheel (i). One or more wheel vibration data values ($\Delta f_i$) are subsequently obtained from a wheel vibration analysis component (102), wherein each of the wheel vibration data values ($\Delta f_i$) is indicative of a vibration phenomena in the time dependent behavior of the rotational velocity of a particular wheel (i). One or more tire pressure output values ($\eta_i$, $\Delta p_i$) are calculated on the basis of both the wheel radius analysis measurement values ($\Delta R$) and the wheel vibration data values ($\Delta f_i$) wherein each tire pressure output value ($\eta_i$, $\Delta p_i$) is indicative of the specific tire pressure deviation for a particular wheel (i).

27 Claims, 13 Drawing Sheets

U.S. PATENT DOCUMENTS

2003/0172728 A1* 9/2003 Gustafsson et al. ............ 73/146
2007/0061100 A1* 3/2007 Hall et al. .................. 702/140

FOREIGN PATENT DOCUMENTS

| JP | 05-133831 A | * | 5/1993 |
| JP | 07-21723 A | * | 1/1995 |
| JP | 09-2031 | * | 1/1997 |
| WO | WO 01/87647 A1 | | 11/2001 |

* cited by examiner

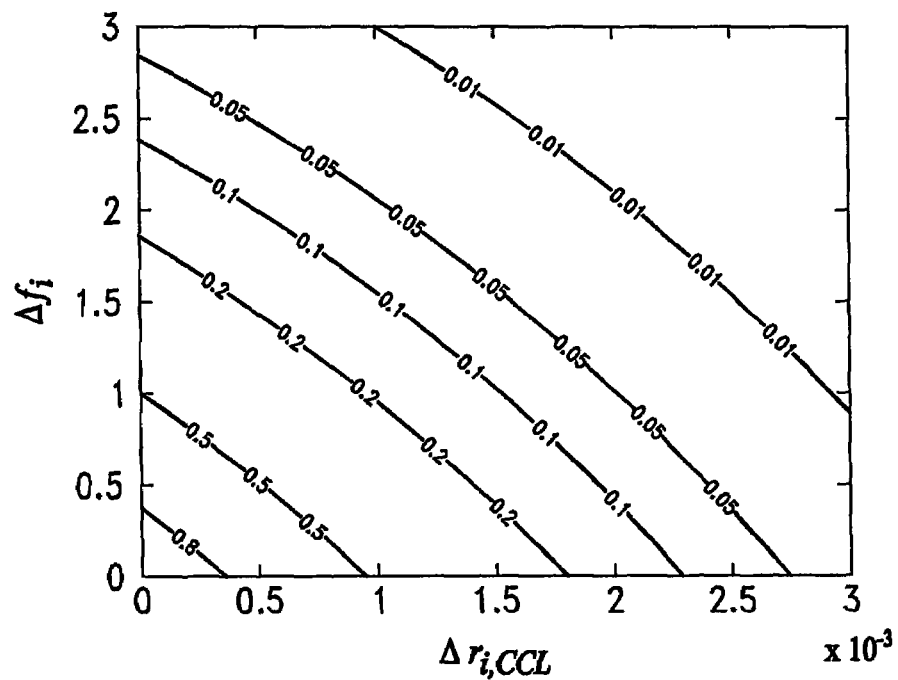
Fig.2A  (a) $\sigma_r = 1.4e-3$, $\sigma_f = 1.45$, $\sigma_1 = 0$, $\sigma_2 = 0.4$, $C = 4$.
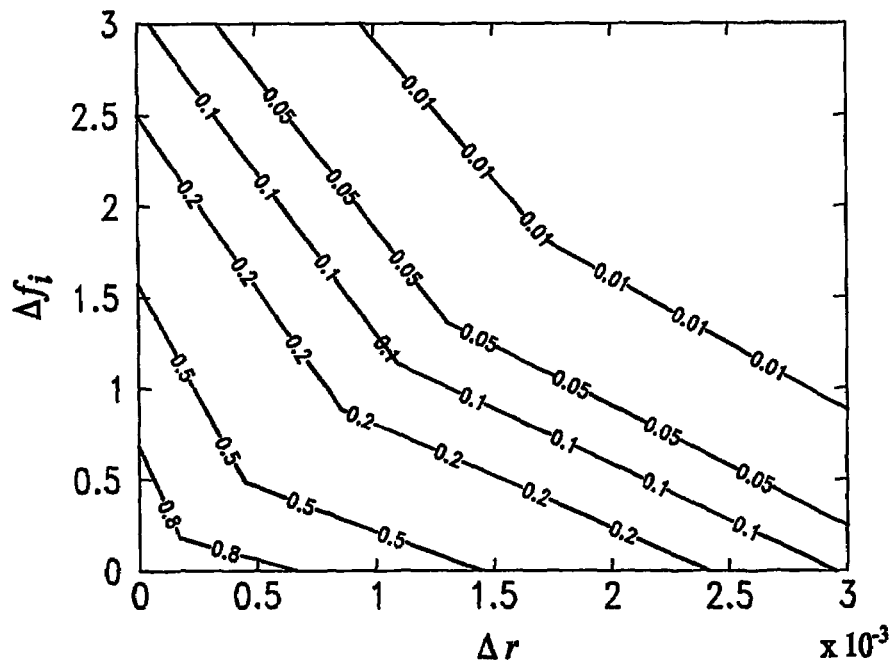
Fig.2B  (b) $\sigma_r = 1.4e-3$, $\sigma_f = 1.45$, $\sigma_1 = 0.5$, $\sigma_2 = 1$, $C = 4$.

TIRE PRESSURE ESTIMATION

FIELD OF THE INVENTION

The present invention relates in general to a method of, a system for and a computer program product for estimating the occurrence of a specific tire pressure deviation between actual and nominal pressure values for one or a plurality of wheels.

BACKGROUND OF THE INVENTION

Driving safety and driving economy play an important role in automobile design. Tire pressure monitoring systems, which contribute to safe driving and enhanced fuel efficiency, are increasingly integrated in automobile equipment. Two different techniques, namely direct and indirect tire pressure measurements, are distinguished in the prior art. Direct measurements, which are very precise, require comparatively expensive equipment integrated within the tire. Indirect measurement systems, which may be based on anti-locking systems (ABS), are easily implemented and cost-efficient but up to now less precise than direct measurement techniques.

Indirect measurement techniques comprise wheel radius analysis (WRA) and wheel vibration analysis (WVA).

In wheel radius analysis, the wheel radii are estimated by comparing the wheel speeds of each vehicle wheel (which may be measured by wheel speed sensors of the ABS) with the vehicle's actual driving velocity. Constant driving velocity provided, the wheel speed increases when the wheel radius decreases due to tire pressure loss.

In wheel vibration analysis, wheel vibration phenomena (which may be measured by wheel speed sensors of the ABS) are detected within the time dependent behavior of the rotational velocity of an individual vehicle wheel. Tires in contact with the road surface during driving are exposed to vibrations. Here, the fact is exploited that the spectral properties (e.g. the energy distribution in different frequency bands) of a wheel angular velocity signal depends on the tire pressure of the individual vehicle wheel.

Traditional tire pressure estimating systems rely on either wheel radius analysis or wheel vibration analysis. Both systems have particular advantages and deficiencies. Estimating tire pressures with wheel radius analysis is easily implemented but affected by vehicle load changes or driving forces during cornering, acceleration and braking, which also lead to wheel radius changes. Wheel vibration analysis, which requires increased computing performance, is very precise in a low and medium velocity range, but shows deficiencies in a high velocity range of the driving velocity.

JP 5-133831 discloses a WVA which identifies a pronounced low frequency resonance which can be measured when the vehicle velocity is low. Typically, the corresponding resonance frequency lies in the range of about 30 to 50 Hz. When the vehicle velocity increases to a high velocity range, the low resonance peak looses intensity. In this velocity range the JP 7-21723 and EP 0925960 further identify a high frequency resonance which is suitable for the tire pressure estimation. The frequency of this resonance is in the range of about 60 to 90 Hz. However, for too high vehicle velocities, it becomes increasingly difficult to use vibrational analysis for tire pressure estimation. FIGS. 12A and 12B show two power spectra of the rotational velocities which correspond to a low and a high vehicle speed, respectively. The low (FIG. 12A) and high (FIG. 12B) resonance peaks can easily be identified.

The low resonance peak is generally ascribed to a torsional resonance in the rotational direction of a tire. When the tire air pressure drops the spring constant in the torsional direction decreases. The high resonance peak is either ascribed to secondary components of the torsional resonance frequency or to tread pattern effects. FIG. 13 shows a typical relation of the tire pressure as a function of the resonance frequency (high resonance peak).

EP 0 925 960 and WO 01/87647 disclose tire air pressure estimating systems implementing both analysis techniques, WVA and WRA, to compensate for the individual deficiencies of these different analysis techniques. Hereby, the system described in EP 0 925 960 switches between the two analysis techniques depending on the current driving parameters and conditions (vehicle velocity, resonance signal intensity, vibration input intensity, brake switch signal, etc.). When the vehicle is in a low or medium velocity range, where WVA is efficient, the tire air pressure estimating is based on the output of the WVA. In the high velocity range, where WVA is less efficient, it relies on the output of the WRA. The tire pressure estimating system disclosed in WO 01/87647 derives for each vehicle wheel two individual confidence level values corresponding to the outputs of the two analysis techniques, WVA and WRA, respectively. If the outputs of the WVA and the WRA correspond to each other, then the sum of the corresponding two individual confidence values is compared with a first threshold value. Otherwise, the higher value among the two individual confidence level values is chosen and compared with a corresponding threshold value (one threshold value for the WVA and WRA, respectively). A tire pressure indication signal indicating a tire pressure loss is generated when one of the three threshold conditions is fulfilled.

OBJECT OF THE INVENTION

The object of the invention is to improve the liability of the estimation of the occurrence of a specific tire pressure deviation for a wheel.

SUMMARY OF THE INVENTION

According to a first aspect the invention achieves this object by a method of estimating the occurrence of a specific tire pressure deviation between actual and nominal pressure values for one or a plurality of wheels. The method comprises subsequently obtaining one or more wheel radius analysis measurement values from a wheel radius analysis component, wherein the wheel radius analysis measurement values are related to single wheel radius values of which each is indicative of the wheel radius of a particular wheel. It further comprises subsequently obtaining one or more wheel vibration data values from a wheel vibration analysis component, wherein each of the wheel vibration data values is indicative of a vibration phenomena in the time dependent behavior of the rotational velocity of a particular wheel. Finally, it comprises calculating one or more tire pressure output values on the basis of both the wheel radius analysis measurement values and the wheel vibration data values wherein each tire pressure output value is indicative of the specific tire pressure deviation for a particular wheel.

According to a second aspect the invention achieves this object by a system for estimating the occurrence of a specific tire pressure deviation between actual and nominal pressure values for one or a plurality of wheels. The system comprises a component for subsequently obtaining one or more wheel radius analysis measurement values from a wheel radius analysis component, wherein the wheel radius analysis measurement values are related to single wheel radius values of which each is indicative of the wheel radius of a particular wheel. It further comprises a component for subsequently obtaining one or more wheel vibration data values from a wheel vibration analysis component, wherein each of the wheel vibration data values is indicative of a vibration phenomena in the time dependent behavior of the rotational velocity of a particular wheel. Finally, it comprises a component for calculating one or more tire pressure output values on the basis of both the wheel radius analysis measurement values and the wheel vibration data values wherein each tire pressure output value is indicative of the specific tire pressure deviation for a particular wheel.

According to a third aspect the invention achieves this object by a computer program product including program code for carrying out a digital signal processing method, when executed on a computer system, for estimating the occurrence of a specific tire pressure deviation between actual and nominal pressure values of one or a plurality of wheels. The method comprises subsequently obtaining one or more wheel radius analysis measurement values from a wheel radius analysis component, wherein the wheel radius analysis measurement values are related to single wheel radius values of which each is indicative of the wheel radius of a particular wheel. It further comprises subsequently obtaining one or more wheel vibration data values from a wheel vibration analysis component, wherein each of the wheel vibration data values is indicative of a vibration phenomena in the time dependent behavior of the rotational velocity of a particular wheel. Finally, it comprises calculating one or more tire pressure output values on the basis of both the wheel radius analysis measurement values and the wheel vibration data values wherein each tire pressure output value is indicative of the specific tire pressure deviation for a particular wheel.

Other features inherent in the tire pressure estimating method and system and the corresponding computer program product are disclosed or will become apparent to those skilled in the art from the following detailed description of embodiments and its accompanying drawings.

BRIEF DESCRIPTION OF THE DRAWINGS

In the accompanying drawings,

FIG. 2A, 2B show two contour plots of the pressure indication value $\eta_1$ for two different sets of tuning parameters;

DETAILED DESCRIPTION OF THE EMBODIMENTS

Figure 1:
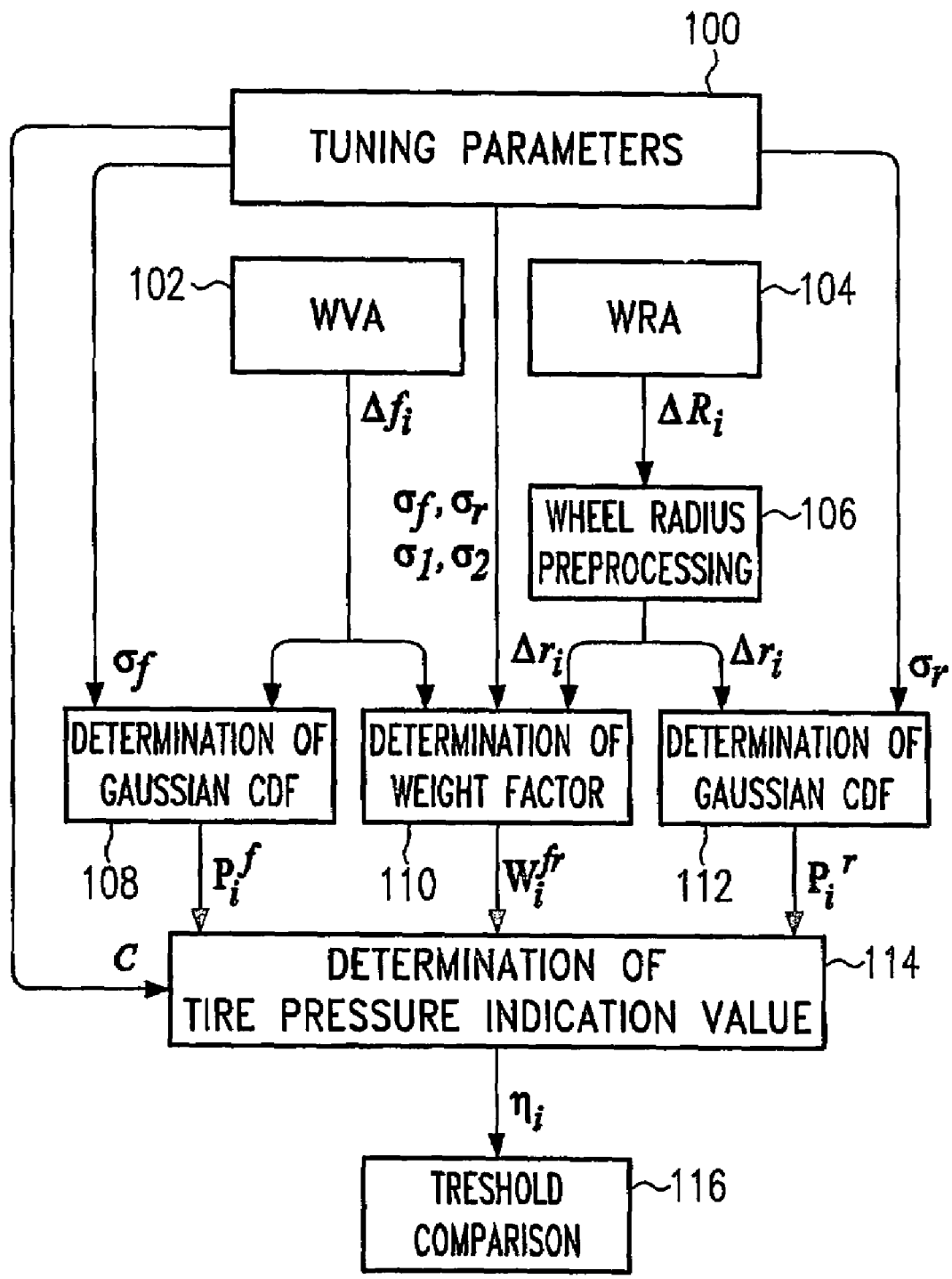
FIG. 1 shows a schematic diagram of a first embodiment of the invention.

Below, rotational speed sensors as used for measuring rotational velocities of vehicle wheels, a wheel radius analysis (WRA) component and a wheel vibration analysis (WVA) component are explained in more detail which are common parts of the various embodiments of the invention.

[Rotational Speed Sensor]

Rotational speed sensors are often used for measuring the angular motion of a rotating axle. The wheel axles in vehicles, the cam shaft in engines and the motor axles in robots are some examples for the application of these sensors. Such a sensor may comprise a transducer (for example an inductive or optical transducer, a Hall sensor, etc.) cooperating with the teeth of a toothed wheel.

Every time a tooth passes the transducer the latter one generates a trigger signal. The rotational speed is determined by measuring the time elapsed between two adjacent trigger signals. Between two adjacent trigger signals the toothed wheel rotates about the angle $\alpha=2\pi/N$, where N is the number of teeth of the wheel. The trigger signals may be sent to a micro-processor unit where they are converted to angular velocity values. Often rotational speed sensors built in the anti-locking system (ABS) of a vehicle are used to provide these angular velocity values.

A more detailed description of rotational speed sensors and their application in the context of tire pressure estimating systems can be found in EP 0925960.

For each of the vehicles wheels, there is provided a permanent input of corresponding angular speed values to a wheel radius analysis component and to the wheel vibration analysis component. The input data values may be provided as time domain sampled data sets (equidistantly spaced in time) or as event domain sampled data sets (non-equidistantly spaced in time).

[Wheel Radius Analysis (WRA) Component]

A WRA is based on the fact that the wheel speed of a wheel depends on the respective wheel radius. The smaller the wheel radius is, the larger is the corresponding wheel speed. A WRA component may in particular provide differences of wheel speeds from pairs of vehicle wheels. The wheel speeds of each wheel are thereby measured by the rotational speed sensors of each wheel. In general, the WRA component outputs a number of WRA measurement values $\Delta R$ of which each is related to either one, two, three or all four single tire radius values $\Delta r_i$ indicating the changes in the wheel radius of a particular wheel i.

According to one preferred embodiment, the WRA component provides a four-dimensional vector $$\Delta R = [\Delta_{YF}, \Delta_{XL}, \Delta_{XR}, \Delta_{YR}]^T. \tag{1a}$$

where $\Delta_{YF}, \Delta_{XL}, \Delta_{XR}$ and $\Delta_{YR}$ are the differences in the wheel radii of the front left and front right, front left and rear left, front right and rear right, rear left and rear right wheels, respectively. The vector $\Delta R$ is related to the single tire radius values $\Delta r_i$ via the following equation:

$$\Delta R = \frac{1}{r_0}\begin{bmatrix} -1 & 1 & 0 & 0 \\ -1 & 0 & 1 & 0 \\ 0 & -1 & 0 & 1 \\ 0 & 0 & -1 & 1 \end{bmatrix}\begin{bmatrix} \Delta r_1 \\ \Delta r_2 \\ \Delta r_3 \\ \Delta r_4 \end{bmatrix} = \frac{1}{r_0} H \Delta r, \quad (2a)$$

where $r_0$ is a known nominal wheel radius and each of the indices 1,2,3,4 of $\Delta r_i$ corresponds to a respective vehicle wheel: 1=front left (FL), 2=front right (FR), 3=rear left (RL), 4=rear right (RR).

It is noted, that the parameters $\Delta_{XL}$, $\Delta_{XR}$, $\Delta_{YF}$ and $\Delta_{YR}$ in fact depend on the tire pressures of the corresponding wheels, but $\Delta_{XL}$ and $\Delta_{XR}$ may also reflect vehicle load changes or surface changes and similarly, $\Delta_{YF}$ and $\Delta_{YR}$ may react on driving forces (acceleration, braking, forces in curves, etc.).

If the vehicle does not include any gyro which outputs yaw rates of the driving vehicle an alternative WRA component may provide a three-dimensional vector $$\Delta R = [\Delta_{XL}, \Delta_{YF} - \Delta_{YR}, \Delta_{XR}]^T. \quad (1b)$$

In this case, the matrix H of equation (2a) may be adopted as follows:

$$H = \begin{bmatrix} -1 & 1 & 1 & -1 \\ -1 & 0 & 1 & 0 \\ 0 & -1 & 0 & 1 \end{bmatrix} \quad (2b)$$

In general terms, the WRA component may consider any arbitrary function of the wheel radius values. For example, the WRA component applies the relationship $$R = f(r_1, r_2, r_3, r_4) \quad (1c)$$

where f is an one, two, three, or four-dimensional function that relates the wheel radius values to an observable (vector-valued) quantity R. Applying a first order Taylor series approximation, the expression $R = f(r_1, r_2, r_3, r_4)$ can for small wheel radius deviations be written as $$R \approx f(r_0, r_0, r_0, r_0) + \underbrace{\begin{bmatrix} \frac{\partial f}{\partial r_1} & \frac{\partial f}{\partial r_2} & \frac{\partial f}{\partial r_3} & \frac{\partial f}{\partial r_4} \end{bmatrix}\begin{bmatrix} \Delta r_1 \\ \Delta r_2 \\ \Delta r_3 \\ \Delta r_4 \end{bmatrix}}_{\Delta R} \quad (1d)$$

The gradient matrix $$H = \begin{bmatrix} \frac{\partial f}{\partial r_1} & \frac{\partial f}{\partial r_2} & \frac{\partial f}{\partial r_3} & \frac{\partial f}{\partial r_4} \end{bmatrix} \quad (2d)$$

should be evaluated using the nominal value $r_0$ for the wheel radius. Consider for example the following quantity:

$$R = \frac{r_1}{r_4} - \frac{r_2}{r_3}. \quad (1e)$$

Application of equation (1d) then shows that $$\Delta R = \frac{1}{r_0}[1 \quad -1 \quad 1 \quad -1]\begin{bmatrix} \Delta r_1 \\ \Delta r_2 \\ \Delta r_3 \\ \Delta r_4 \end{bmatrix}. \quad (1f)$$

The outputs of a WRA component are not limited to the exemplified outputs of equations (1a-f). For each specific WRA component, the Taylor series approach (equation (1d)) can be applied to construct a corresponding gradient matrix H which relates the WRA measurement values $\Delta R$ to the single tire radius values $\Delta r_i$.

[Wheel Vibration Analysis (WVA) Component]

The WVA component used in the embodiments of the present invention can be of any type contemplated, in particular of those types as mentioned in the introductory part of the application. For a brief summary of the principles of WVA reference is made as well to the prior art as discussed above.

The WVA component outputs wheel vibration data values (for example the energy distribution in different frequency bands in the time dependent behavior of the rotational velocity of a particular wheel (i), one or more resonance frequencies of a specific wheel (i) or any other suitable measure). In the following, these WVA component outputs are generally denoted as vibration phenomena values.

The WVA component used in the embodiments of the present invention provides a four-dimensional vector $\Delta f$ whose components indicate the deviation between a currently measured vibration phenomena value and a corresponding calibration value:

$$\Delta f = [\Delta f_1, \Delta f_2, \Delta f_3, \Delta f_4]^T. \quad (3)$$

The indices i=1, 2, 3 and 4 here again denote the respective wheels FL, FR, RL and RR (see above). A tire pressure drop in a is particular tire will lead to a decreasing value of the currently measured vibration phenomena value. The corresponding component of $\Delta f$ will hence become significantly negative when the tire pressure decreases.

First Embodiment

FIG. 1 shows a schematic diagram of a first embodiment according to the invention. In a preprocessing step 106 (according to equation (2a), see above), the values $\Delta R_i$ (i=YF,XL,XR,YR) obtained from a WRA 104 are transformed to single tire radius values $\Delta r_i$ (i=FL,FR,RL,RR). Then, probabilities $P_i^f$ and $P_i^r$ are computed from the vibration phenomena values $\Delta f_i$ obtained from a WVA 102 in step 108 and from the single tire radius values $\Delta r_i$ in step 112, respectively, on the basis of a Gaussian cumulative probability distribution function by treating the values $\Delta f_i$ and $\Delta r_i$ as independent Gaussian distributed random variables. In a further step 110, a weight factor $W_i^{fr}$ is calculated to penalize disagreement between the outputs $\Delta f_i$ and $\Delta R_i$ from the WVA and WRA. Based on the obtained values $P_i^f$, $P_i^r$ and $W_i^{fr}$, a tire pressure indication value $\eta_i$ is computed in step 114, which is then compared with a predetermined threshold value in step 116. The above steps 106 to 116 are described in more detail in the following.

In step 106, the measurement vector ΔR is preferably transformed into the vector Δr, whose elements describe the changes in wheel radius of each particular vehicle wheel (see also above). This transformation involves the inversion of the matrix given in equation (2a), and this inversion is non-trivial since said matrix is singular. The matrix is singular since the WRA component is not able to detect pressure deviations that simultaneously occur in all four wheels. Assuming that the wheel radius cannot increase, a pseudo-inversion of equation (2a) is however obtained by the following transformation:

$$r_{tmp} = r_0 \cdot H\dagger \cdot \Delta R, \qquad (5)$$

$$\Delta r = r_{tmp} - \max(r_{tmp}) \cdot [1\ 1\ 1\ 1]^T. \qquad (6)$$

Here, the vector $r_{tmp}$ is only used in an intermediate step. The matrix $H\dagger$ is the pseudo-inverse of the matrix H and is defined as follows:

$$H^\dagger = \frac{1}{8}\begin{bmatrix} -3 & -3 & -1 & -1 \\ 3 & -1 & -3 & 1 \\ -1 & 3 & 1 & -3 \\ 1 & 1 & 3 & 3 \end{bmatrix}. \qquad (7)$$

In steps 108 to 114 the following computations are performed, in order to estimate the probability (or confidence level) $\eta_i$ (a possible pressure output value of the tire pressure estimation system) for the hypothesis "no deflation of tire i". In step 108, the probability $P_i^f$ of a vibration phenomena deviation for tire i which is larger than $\Delta f_i$, is computed from $$P_i^f = 1 - \Phi\left(-\frac{\Delta f_i}{\sigma_f}\right) \qquad (8)$$

Similarly in step 112, the probability $P_i^r$ of a wheel radius deviation for tire i which is larger than $\Delta r_i$ is computed from $$P_i^r = 1 - \Phi\left(-\frac{\Delta r_i}{\sigma_r}\right). \qquad (9)$$

Here, the function $\Phi(x)$ is the cumulative probability distribution function (CDF) for a Gaussian random variable with standard deviation σ=1:

$$\Phi(x) = \frac{1}{\sqrt{2\pi}} \int_{-\infty}^{x} e^{-\frac{t^2}{2}} dt \qquad (10)$$

In equations (8) and (9), $\sigma_f$ and $\sigma_r$ are the corresponding standard deviations of the vibration phenomena value and tire radius measurements, respectively. Preferably, the standard deviations may be predetermined tuning parameters obtained from test drives. These tuning parameters are stored in a tuning parameter memory 100. They stay constant during operation of the tire pressure estimating system. For those skilled in the art, various alternatives for choosing or measuring the standard deviation parameters are easily contemplated, including those with dynamically adapted values.

In step 110, an additional weight factor $W_i^{fr}$ is calculated in order to penalize disagreement between the outputs $\Delta f_i$ and $\Delta R_i$ from the WVA 102 and WRA 104, which is defined as follows:

$$W_i^{fr} = \exp\left(\sigma_1\left|\frac{\Delta f_i}{\sigma_f} - \frac{\Delta r_i}{\sigma_r}\right|\right) \cdot \exp\left(\sigma_2\left|\frac{\Delta f_i \Delta r_i}{\sigma_f \sigma_r}\right|\right), \qquad (11)$$

and whose effect will be explained in more detail below. $\sigma_1$ and $\sigma_2$ are further tuning parameters (cp. above).

In step 114, the pressure indication value $\eta_i$ (namely, the test quantity in the above hypothesis test) for a flat tire is computed as follows:

$$\eta_i = C \cdot P_i^f \cdot P_i^r \cdot W_i^{fr}. \qquad (12)$$

The constant C is another tuning parameter which is predefined and stored in the tuning parameter memory 100. It is chosen as such that if there are no deviations from the calibration values ($\Delta f_i=0$, $\Delta r_i=0$), the confidence level for the hypothesis "no deflation of tire i" is $\eta_i=1$. Negative values of the deviation parameters $\Delta f_i$ and $\Delta r_i$ lead to a decrease of the pressure indication value $\eta_i$. The value $\eta_i$ is an indicator for the statistical significance of the occurrence of a specific pressure deviation (e.g. flat tire condition, pressure drop about a given amount, pressure increase about a given amount).

In step 116, the pressure indication value $\eta_i$ is compared with a critical threshold value $\eta_c$. If $\eta_i$ falls below $\eta_c$ ($\eta_i < \eta_c$), a tire pressure loss signal (alarm) is triggered. The tire pressure loss signal may for example be issued if $\eta_i < 0.1$. To avoid toggling between alarm/no alarm, the alarm is not reset if $\eta_i$ increases just slightly above the threshold value $\eta_c$. Instead it is required that $\eta_i$ increases to a value well above the threshold value $\eta_c$. The desired specific pressure deviation whose occurrence shall be monitored may be adjusted by the standard deviation parameters $\sigma_f$ and $\sigma_r$ as well as the critical threshold value $\eta_c$.

The effect of introducing the weight factor $W_f^{fr}$ is to enhance the decrease of $\eta_i$ for substantially conforming deviation values from the WVA 102 and WRA 104 ($\Delta f_i/\sigma_f \approx \Delta r_i/\sigma_r$) and to suppress the decrease of $\eta_i$ for substantially non-conforming deviation values ($\Delta f_i/\sigma_f \neq \Delta r_i/\sigma_r$). The strength of the effect can be tuned with the parameters $\sigma_1$ and $\sigma_2$, which preferably have predefined constant values obtained from test drive situations, similar to the parameters $\sigma_f$ and $\sigma_r$. $\sigma_1$ and $\sigma_2$ are adjusted as much that the desired triggering of the tire pressure loss signal is obtained.

To illustrate this effect, contour plots of the pressure indication value $\eta_1$ for two different sets of tuning parameters $\sigma_1$ and $\sigma_2$ are shown in FIGS. 2A and 2B. For the plot shown in FIG. 2A, the parameters were chosen to be small ($\sigma_1=0$, $\sigma_2=0.4$) in order to introduce merely a small penalizing effect. In this case, the gradients in direction of the axes (distance of the contour lines near the axes), where WVA and WRA disagree with each other, is similar to the gradient along the diagonal $\Delta f_1/\sigma_f = \Delta r_1/\sigma_r$, where WVA and WRA agree with each other. For the plot shown in FIG. 2B, the parameters were chosen to be large ($\sigma_1=0.5$, $\sigma_2=1.0$) in order to introduce a strong penalizing effect. This renders the gradient along the diagonal steeper than the gradient in direction of the axes.

Figure 3:
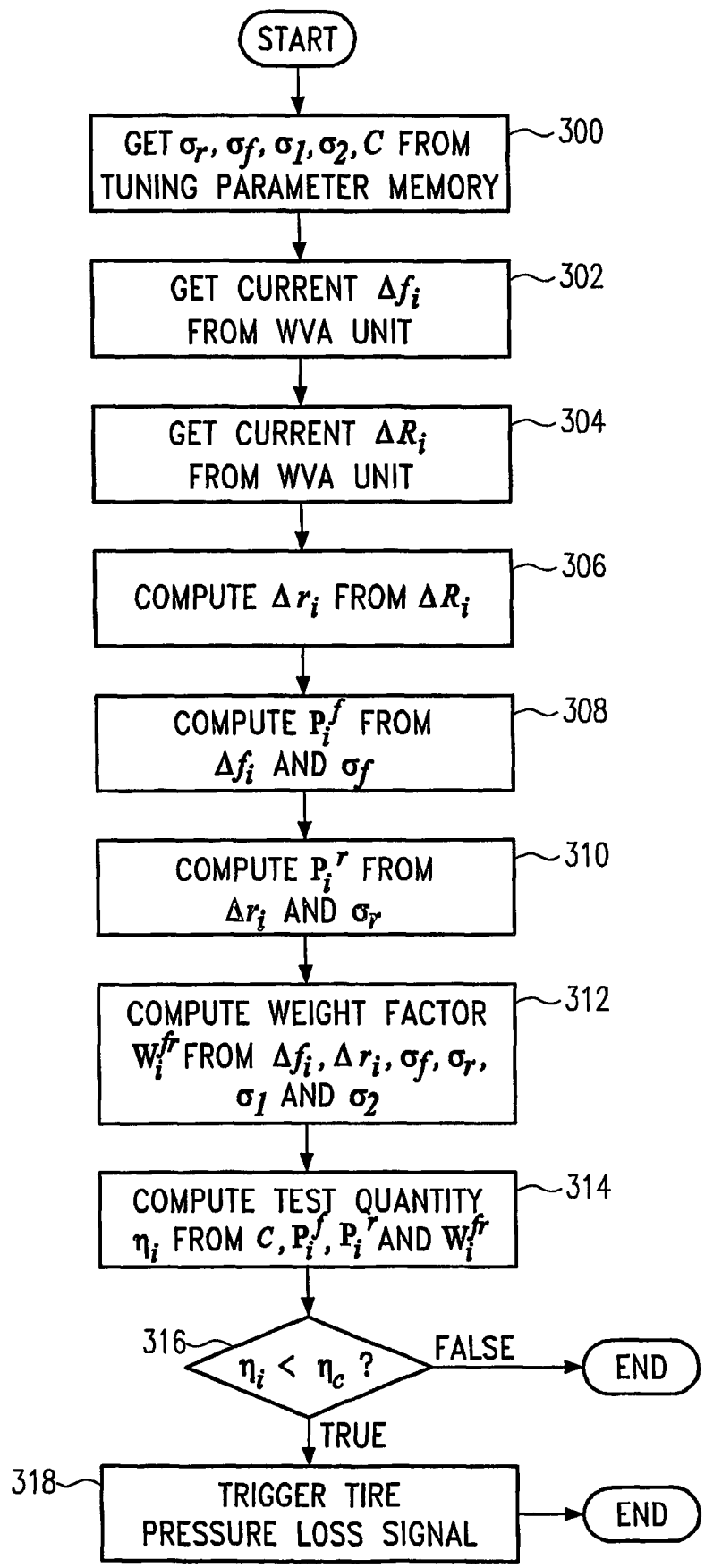
FIG. 3 shows a flow diagram of the process steps of an implementation of the first embodiment.

FIG. 3 shows a flow diagram of the method for calculating the pressure indication value $\eta_i$. In a first step 300, the tuning parameters $\sigma_f$, $\sigma_r$, $\sigma_1$, $\sigma_2$ and C are received from the tuning parameter memory 100. In a second step 302, the current vibration phenomena deviation value $\Delta f_i$ is received from a WVA component, and, in a third step 304, the current tire radius deviation value $\Delta R_i$ is received from a WRA component. In a further preprocessing step 306, the tire radius deviation value $\Delta R_i$ is transformed to a single tire radius deviation value $\Delta r_i$. In two subsequent steps 308 and 310, the Gaussian CDF values $P_i^f$ and $P_i^r$ are computed from the quantities $\Delta f_i$, $\sigma_f$ and $\Delta r_i$, $\sigma_r$, respectively. In a next step 312, the weight factor $W_i^{fr}$ is computed from the quantities $\Delta f_i$, $\Delta r_i$, $\sigma_f$, $\sigma_r$, $\sigma_1$ and $\sigma_2$. Finally, the pressure indication value $\eta_i$ is computed from C, $P_i^f$, $P_i^r$ and $W_i^{fr}$ in step 314, which is compared with the predetermined threshold value $\eta_c$ in step 316. If the pressure indication value $\eta_i$ is less than the threshold value $\eta_c$, a tire pressure loss signal is triggered in step 318. The procedure is repeated for every new data received from the WVA and WRA components.

Figure 4:
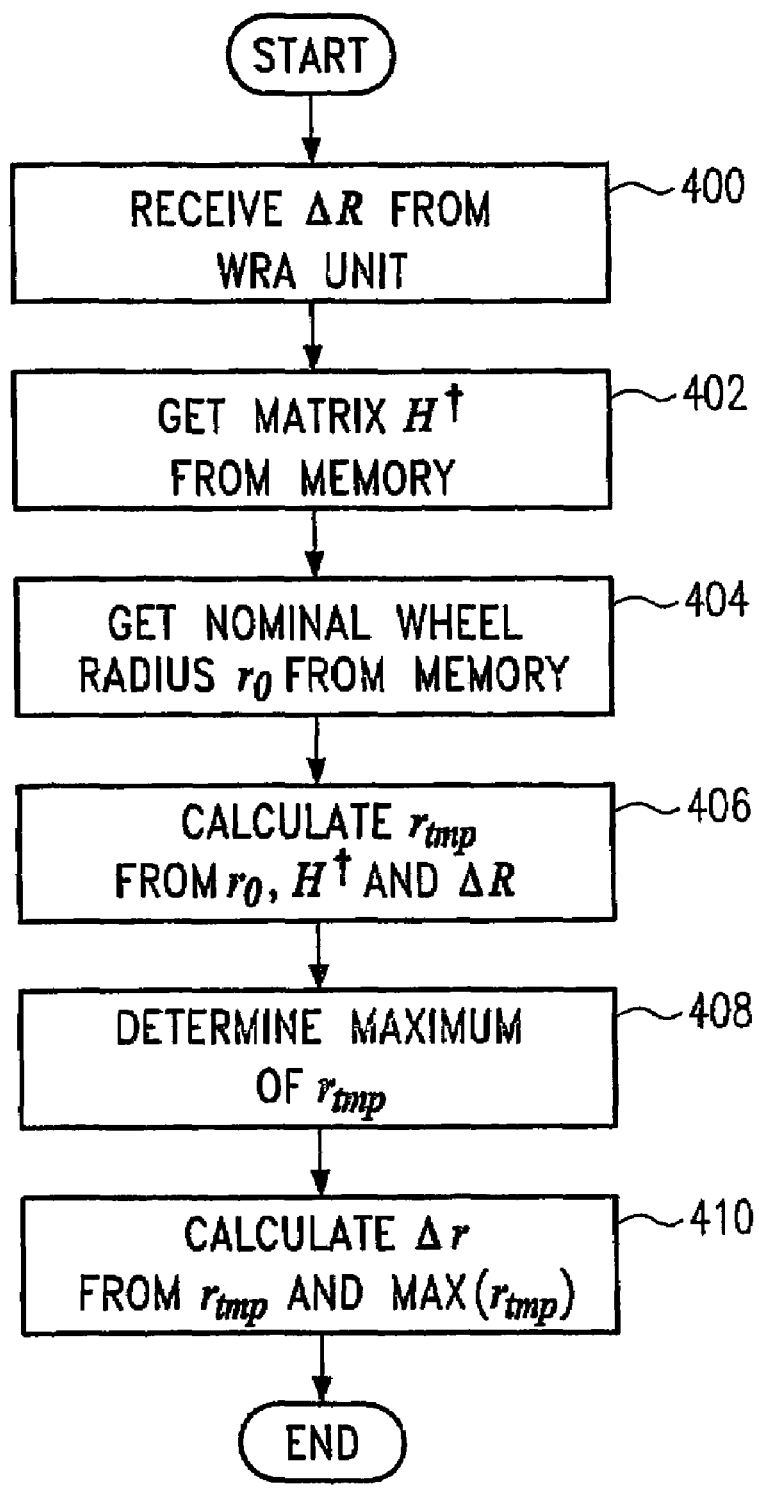
FIG. 4 shows a flow diagram of the process steps of a preferred tire radius transformation which is performed in the first embodiment.

FIG. 4 shows a flow diagram for the preferred preprocessing of wheel radius deviation values $\Delta R_i$ (step 306 in FIG. 3). In a first step 400, the wheel radius deviation values $\Delta R_i$ are received from the WRA component. In a second and third step 402 and 404, the predetermined pseudo-inverse matrix H† and the known nominal wheel radius $r_0$, respectively, are read from a persistent memory (e.g. the parameter tuning memory 100 of FIG. 1). In step 406, a temporary radius deviation vector $r_{tmp}$ is calculated by computing the product $r_0 \cdot H\dagger \cdot \Delta R$. In a subsequent step 408, the maximum element of the vector $r_{tmp}$ is determined and then, in step 410, the single tire radius deviation values $\Delta r_i$ are computed therefrom (which are further processed in step 310 of FIG. 3).

Second Embodiment

Figure 5:
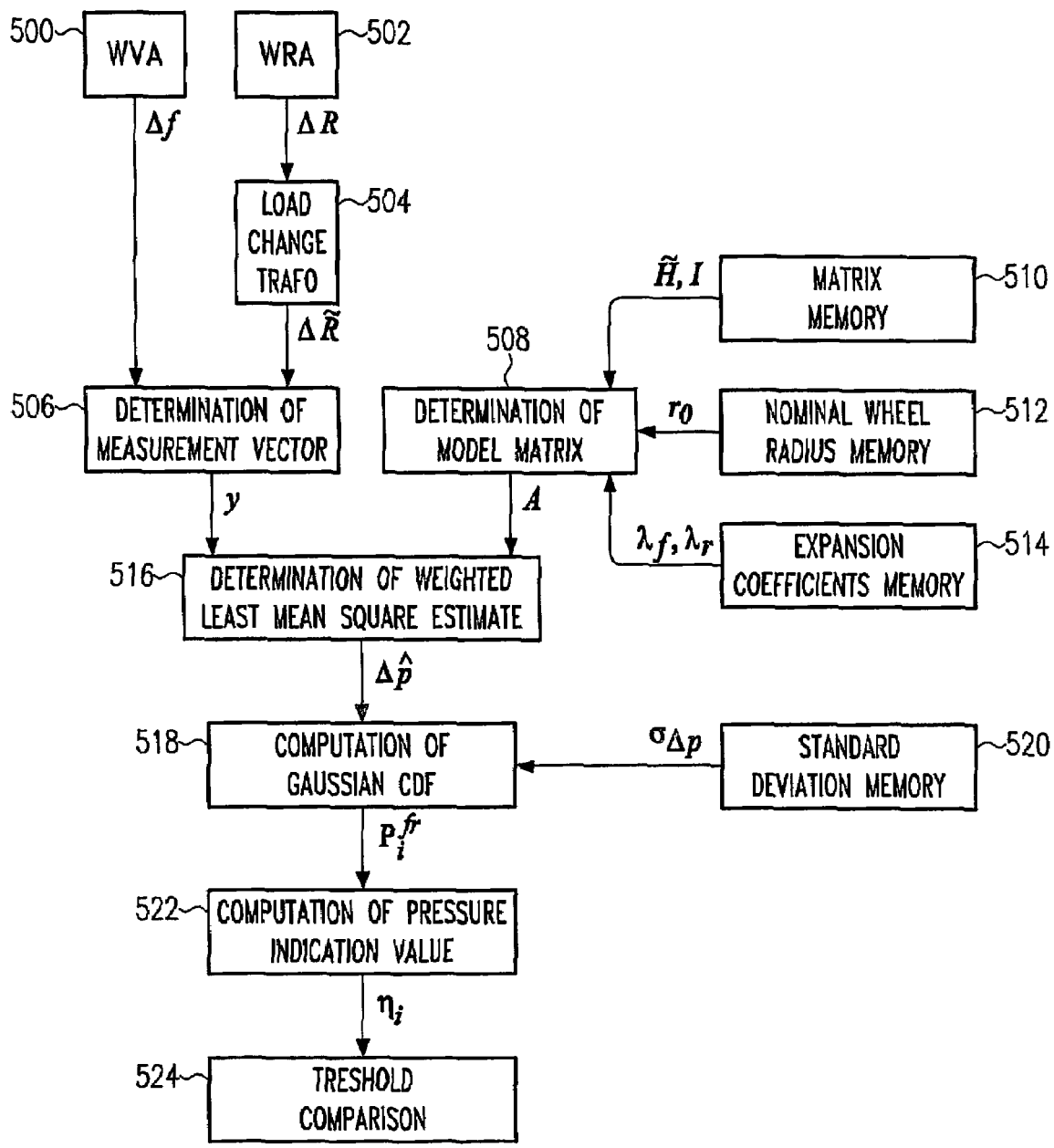
FIG. 5 shows a schematic diagram of a second embodiment of the invention.

FIG. 5 shows a schematic diagram of a second embodiment according to the invention. Here, the model underlying the tire estimation is based on the assumption that the wheel radius value $\Delta R_i$ and the wheel vibration value $\Delta f_i$ depend on the same pressure parameters $\Delta p_i$ instead of treating these measurement values as independent quantities. The tire pressure vector $$\Delta p = \left[ \frac{p_{0,FL} - p_{FL}}{p_{0,FL}} \quad \frac{p_{0,FR} - p_{FR}}{p_{0,FR}} \quad \frac{p_{0,RL} - p_{RL}}{p_{0,RL}} \quad \frac{p_{0,RR} - p_{RR}}{p_{0,RR}} \right]^T \quad (13)$$

consists of four pressure deviation values $\Delta p_i$, one for each wheel (i=FL,FR,RL,RR). $p_i$ is the current pressure value of the wheel i to be determined, and $p_{0,i}$ is the corresponding calibration pressure value. (The $\Delta p_i$ are possible pressure output values of the tire pressure estimation system.)

In a load change transformation step 504, the wheel radius values $\Delta R_i$ obtained from the WRA 502 are transformed into modified wheel radius values $\Delta \tilde{R}_i$ in order to reduce the impact of vehicle load changes. Hereby, the four components of the vector $\Delta R$ are reduced to three components of the vector $\Delta \tilde{R}$, which are defined as $\Delta \tilde{R} = [\Delta_{YF} \quad \Delta_{XL} - \Delta_{XR} \quad \Delta_{YR}]^T$ (cp. equation (1c)). The quantity $\Delta_{XL} - \Delta_{XR}$ of the vector $\Delta \tilde{R}$ is considerably less sensible to load changes than the quantities $\Delta_{XL}$ and $\Delta_{XR}$ of the vector $\Delta R$.

According to the model of this embodiment, the relation between is on the one hand the pressure values $\Delta p_i$ and on the other hand the wheel radius values $\Delta \tilde{R}_i$ obtained in step 504 and the wheel vibration values $\Delta f_i$ obtained from the WVA 500 is as follows:

$$\underbrace{\begin{bmatrix} \Delta \tilde{R} \\ \Delta f \end{bmatrix}}_{y} = \underbrace{\begin{bmatrix} \frac{\lambda_r}{r_0} \tilde{H} \\ \lambda_f I \end{bmatrix}}_{A} \cdot \underbrace{\Delta p}_{x} \quad (14a)$$

where $$\tilde{H} = \begin{bmatrix} -1 & 1 & 0 & 0 \\ -1 & 1 & 1 & -1 \\ 0 & 0 & -1 & 1 \end{bmatrix} \quad (15)$$

is the modified version of the matrix H according to equation (2a). The combined measurement vector y is determined in step 508 from the values $\Delta \tilde{R}_i$ and $\Delta f_i$ in step 506, and the model matrix A is determined from the matrix $\tilde{H}$ and the 4×4 identity matrix I which are both read from a matrix memory 510, from the parameter $r_0$ which is the known nominal wheel radius read from the nominal wheel radius memory 512, and from expansion coefficients $\lambda_r$ and $\lambda_f$ read from a expansion coefficients memory 514.

The model is based on a first order series expansion of the measurement values $\Delta \tilde{R}_i$ and $\Delta f_i$ in the tire pressure deviations $\Delta p_i$, where the expansion coefficients $\lambda_r$ and $\Delta_f$ (which are preferably estimated in test drives) are the first order coefficients of this series expansion. Since typically a 30% tire pressure decrease approximately results in a 0.25% tire radius decrease, a reasonable choice of $\lambda_r$ is:

$$\lambda_r = \frac{-2.5 \cdot 10^{-3}}{-0.3}, \quad (16)$$

The choice of $\lambda_f$ depends on the type of vibration phenomena measured by the WVA component.

For those skilled in the art, more complex relations between the measurement values $\Delta \tilde{R}_i$, $\Delta f_i$ and the tire pressure deviations $\Delta p_i$ can be contemplated. For this, a preferred generalized functional dependence can be assumed as follows:

$$\begin{bmatrix} \Delta_{YF} \\ \Delta_{XL} - \Delta_{XR} \\ \Delta_{YR} \\ \Delta f_1 \\ \Delta f_2 \\ \Delta f_3 \\ \Delta f_4 \end{bmatrix} = \begin{bmatrix} g_1(\Delta p_1, \Delta p_2) \\ g_2(\Delta p_1, \Delta p_2, \Delta p_3, \Delta p_4) \\ g_3(\Delta p_3, \Delta p_4) \\ f(\Delta p_1) \\ f(\Delta p_2) \\ f(\Delta p_3) \\ f(\Delta p_4) \end{bmatrix} \quad (17)$$

where the arbitrary functions $f$, $g_1$, $g_2$ and $g_3$ have to be estimated by the contemplated model.

In order to solve equation (14a) for the unknown tire pressure deviation values $\Delta p_i$, the skilled person would contemplate various alternative solutions.

One preferred solution is based on a weighted least square estimate which is performed in step 516 and derives weighted least square estimates $\Delta \hat{p}_i$ for the pressure deviation vector $\Delta p$ according to the following formula:

$$\Delta \hat{p}(t) = (A^T A)^{-1} A^T y(t) \quad (18)$$

Here, A is the matrix defined in equation (14a).

In step 522, the pressure indication values $\eta_i$ for each vehicle wheel (i=1,2,3,4) can finally be calculated by assuming that the obtained pressure deviation values $\Delta \hat{p}_i$ are Gaussian distributed random quantities, which are computed in a preceding step 518 according to equation (10) with a standard deviation Hap read from a standard deviation memory 520. Both steps 518 and 522 commonly implement the following formula:

$$\eta_i = P_i^{fr} = 1 - \Phi\left(-\frac{\Delta \hat{p}_i}{\sigma_{\Delta p}}\right). \tag{19}$$

where $\Phi(x)$ is the Gaussian cumulative probability distribution function defined in equation (10). The standard deviation value $\sigma_{\Delta p}$ is preferably treated as a predefined tuning parameter which is obtained from test drives and most preferably stays constant during operation of the tire pressure estimating system. It could as well be determined from statistical computations on the basis of subsequently derived pressure deviation values $\Delta \hat{p}_i$ or by other ways which can be contemplated by those skilled in the art.

In step 524, tire pressure loss signals are then triggered in a similar way as in step 116 of the second embodiment by comparison of the pressure indication values $\eta_i$ with a critical threshold value.

Figure 6:
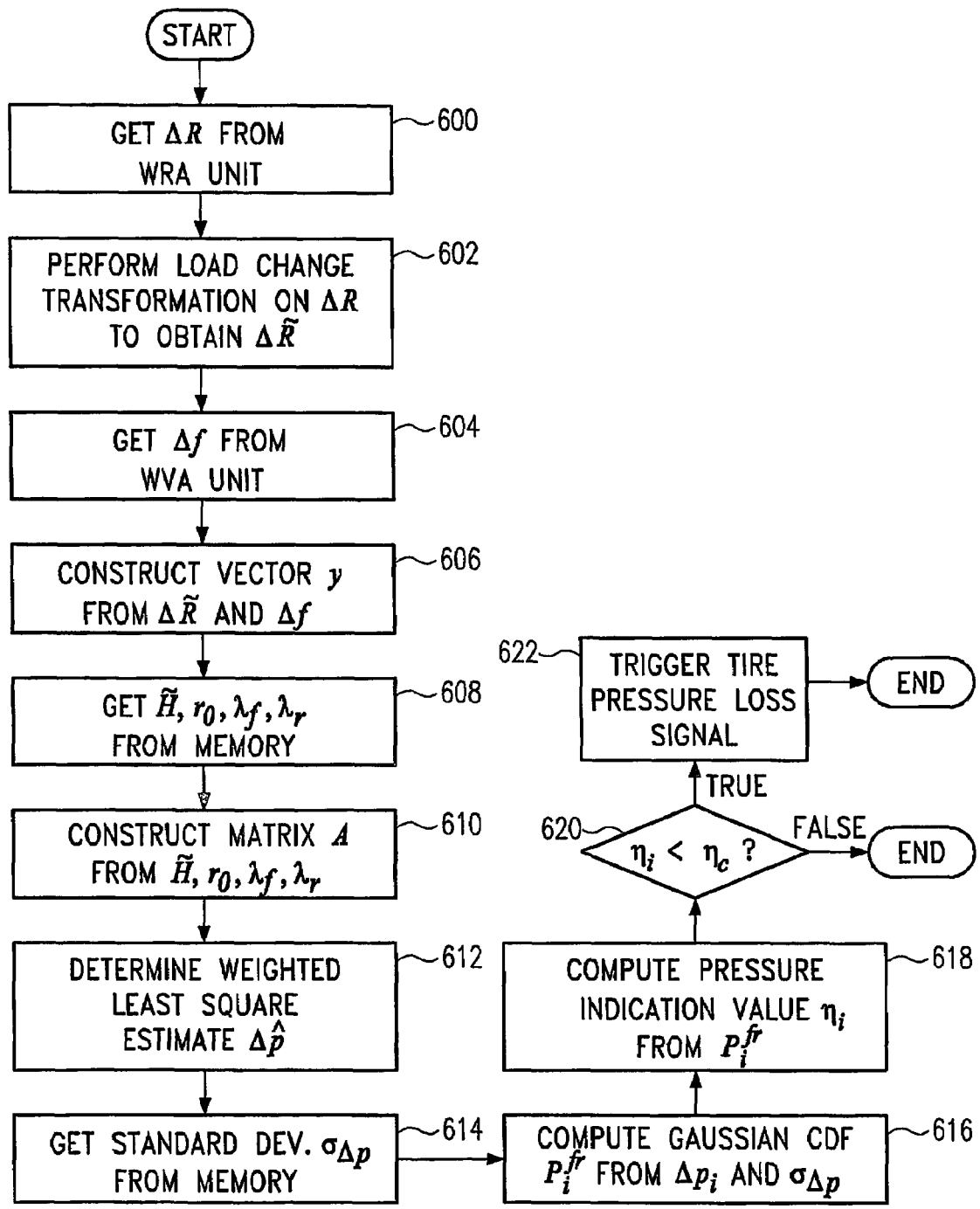
FIG. 6 shows a flow diagram of the process steps of an implementation of the second embodiment.

FIG. 6 shows a flow diagram of the process steps of an implementation of the above described embodiment. In step 600 wheel radius values $\Delta R_i$ are obtained from the WRA component. In a subsequent step 602, these wheel radius values $\Delta R_i$ are transformed to the modified wheel radius values $\Delta \tilde{R}_i$ which are less sensitive to load changes. In step 604, vibration phenomena values $\Delta f_i$ are obtained from the WVA component. In step 606, the measurement vector y is constructed from the wheel radius values $\Delta R_i$ and the vibration phenomena values $\Delta f_i$. The model matrix $\tilde{H}$, the nominal wheel radius $r_0$ and the coefficients $\lambda_f, \lambda_r$ are fetched from a memory in step 608 to construct the model matrix A in step 610. Then, in step 612 the pressure parameters $\Delta p_i$ are estimated by a Weighted Least Square Method resulting in estimated pressure values $\Delta \hat{p}_i$. In step 614, the predetermined standard deviation parameter $\sigma_{\Delta p}$ is fetched from a standard deviation parameter memory and in step 616, the probability value $P_i^{fr}$ is computed from $\Delta \hat{p}_i$ and $\sigma_{\Delta p}$ according to equation (19). In this embodiment, the pressure indication value $\eta_i$ is identical to the probability value $P_i^{fr}$ (see equation (19)) so that the calculation in step 618 is trivial. Finally, in step 620, the pressure indication value $\eta_i$, similarly to the first embodiment, is compared with a predetermined threshold value $\eta_c$. If the pressure indication value $\eta_i$ is less than the threshold value $\eta_c$, a tire pressure loss signal is triggered in step 622. The procedure is repeated for every new data received from the WVA and WRA components.

Besides, equation (14a) may be written in the following generalized form which covers the general form of the WRA measurement outputs according to equations (1a-f) and other WRA measurement outputs as well as different WVA measurement outputs:

$$\underbrace{\begin{bmatrix} \Delta R/\lambda_r \\ \Delta f/\lambda_f \end{bmatrix}}_{y} = \underbrace{\begin{bmatrix} H \\ I \end{bmatrix}}_{A} \underbrace{\Delta p}_{x} \tag{14b}$$

where I denotes the identity matrix and H an arbitrary matrix adapted a specific WRA component (see above).

Third Embodiment

In regard to the following description of FIGS. 7, 8, 9 and 10, it is noted that the features of the invention designated as steps 700, 706, 708, 710, 712, 714, 718, 720, 722, 724, 800, 802, 804, 806, 808, 810, 814, 816, 818, 820, 822, 900, 902, 1002, 1004, 1010 & 1012 correspond to the same steps of FIGS. 5 & 6 but with different step numbers starting with the designation of the figure.

Figure 7:
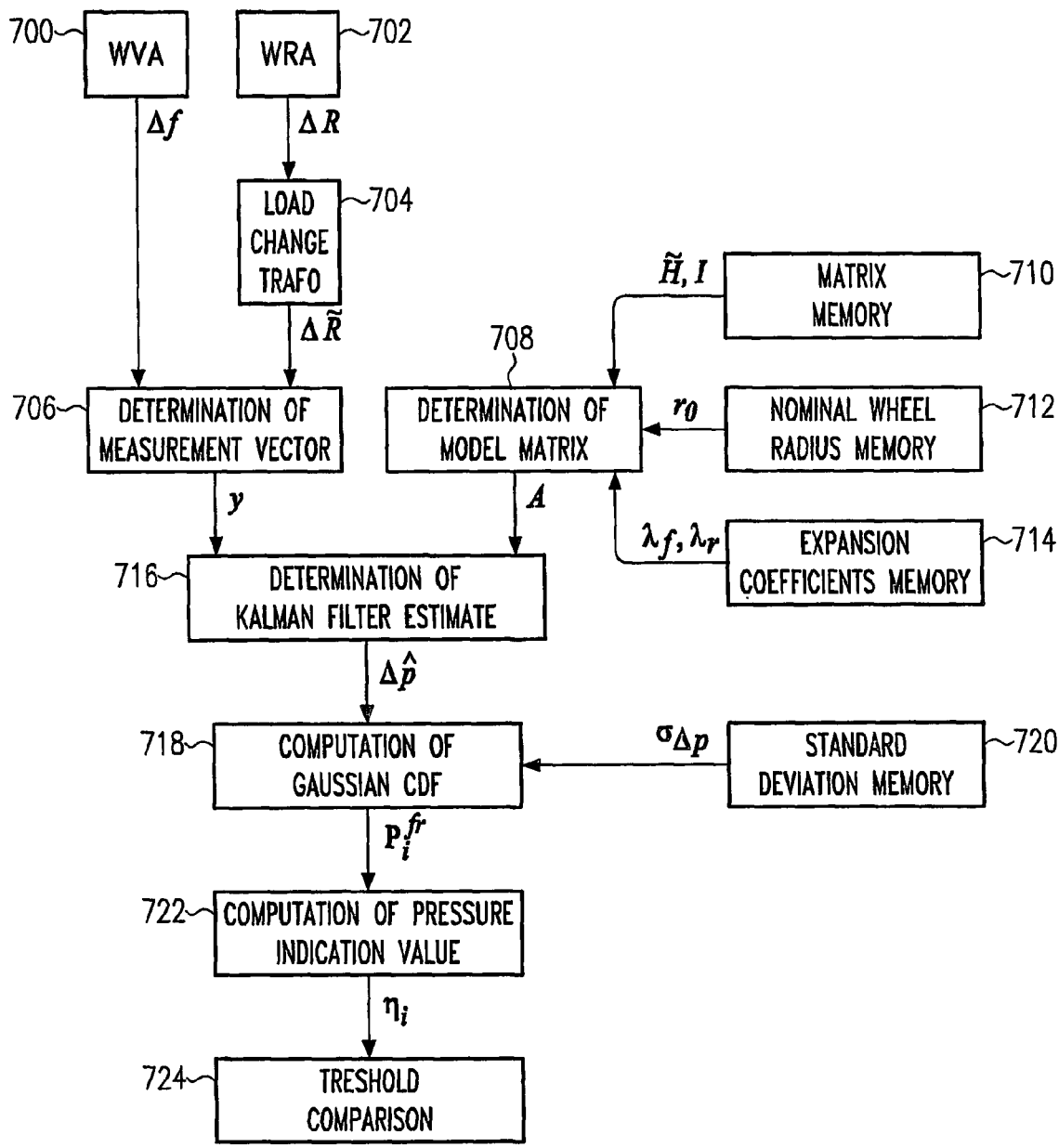
FIG. 7 shows a schematic diagram of a third embodiment of the invention.
Figure 8:
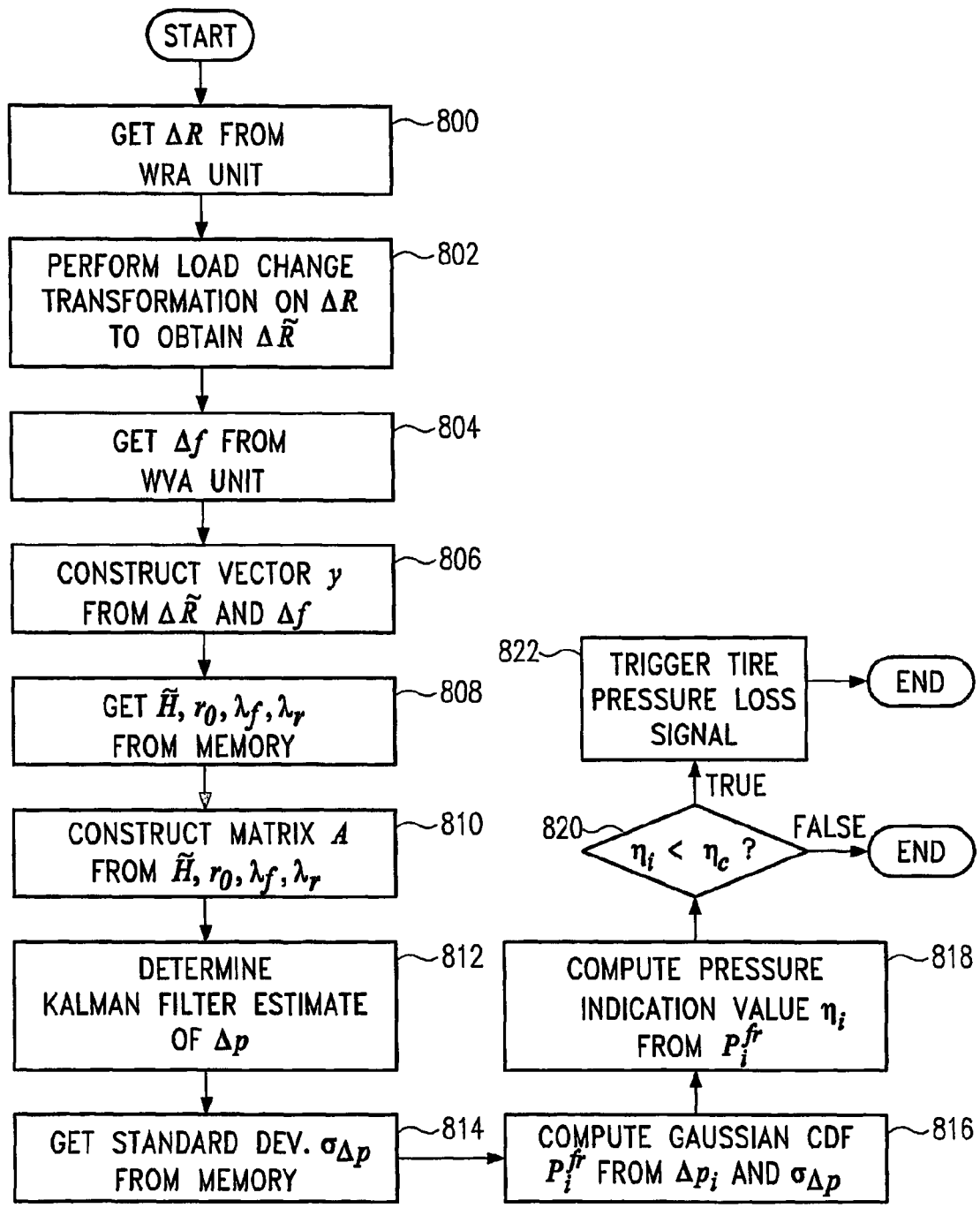
FIG. 8 shows a flow diagram of the process steps of an implementation of the third embodiment.

FIGS. 7 and 8 show a schematic diagram of a third embodiment of the invention and a flow diagram of the process steps of an implementation of the third embodiment, respectively. The third embodiment is based on the same model as the second embodiment. Instead of using a weighted least square estimate (step 516 of the second embodiment) for deriving the tire pressure deviation values $\Delta \hat{p}_i$ from the vibration phenomena values $\Delta f_i$ and the wheel radius values $\Delta \tilde{R}_i$ according to model equation (14a) (or wheel radius values $\Delta R_i$ according to equation (14b)), alternatively an adaptive Kalman filter is used in a corresponding step 716. Therefore, a description of identical steps performed in the third embodiment is here omitted. Instead, reference is made to the description of the corresponding steps performed by the second embodiment as shown in FIGS. 5 and 6.

The adaptive Kalman filter subsequently receives the input values from the WVA and WRA components 700 and 702 (more precisely from the load change transformation step 704) and outputs its filter estimates for the pressure deviation values $\Delta p_i$, whereby it simultaneously adapts its filter parameters. The filter parameter adaptation and the calculation of the filter estimates can be easily implemented within a pressure estimating system and offers less computational burden and memory demands.

For a more detailed description of the adaptive Kalman filter see for example the books:

[1] Maybeck, Peter S.: Stochastic models, estimation, and control, Mathematics in Science and Engineering, Volume 141, 1979;

[2] Zarchan, Paul and Musoff, Howard: Fundamentals of Kalman Filtering: A Practical Approach, 2000, AIAA.

The filter equation for the adaptive Kalman filter is given by equation (14a) according to:

$$y(t) = A \cdot \Delta p(t) + e(t) \tag{20a}$$

where e(t) is a noise vector. For the state sequence (i.e. the unknown tire pressure $\Delta p(t)$) a standard model is applied:

$$\Delta p(t+1) = \Delta p(t) + w(t) \tag{20b}$$

where w(t) is white noise.

Applying models (20a) and (20b), the Kalman filter then estimates a tire-pressure value $\Delta \hat{p}$ according to the following recursion:

$$\Delta \hat{p}(t) = \Delta \hat{p}(t-1) + K(t)(y(t) - A \Delta \hat{p}(t-1))$$

$$K(t)=P(t-1)A(S+A^TP(t-1)A)^{-1}$$

$$P(t)=P(t-1)-P(t-1)A^T(S+A^TP(t-1)A)^{-1}+Q \quad (20c)$$

The matrices S and Q are considered to be tuning parameters that control the adaptation speed of the Kalman filter.

The pressure indication values $\eta_i$ for each vehicle wheel (i=1,2,3,4) are then calculated from the obtained pressure deviation values $\Delta\hat{p}_i$ in the same way as shown in the second embodiment.

FIG. 8 shows a flow diagram of the process steps of an implementation of the above described embodiment. The process steps of the third embodiment differ from the process steps of the second embodiment described in FIG. 6 only in that the estimation of the pressure parameters by a Weighted Least Square Method in step 612 of FIG. 6 is replaced by the above described Kalman Filter estimate in step 812 of FIG. 8. All remaining process steps are identical in both embodiments.

Fourth Embodiment

Figure 9:
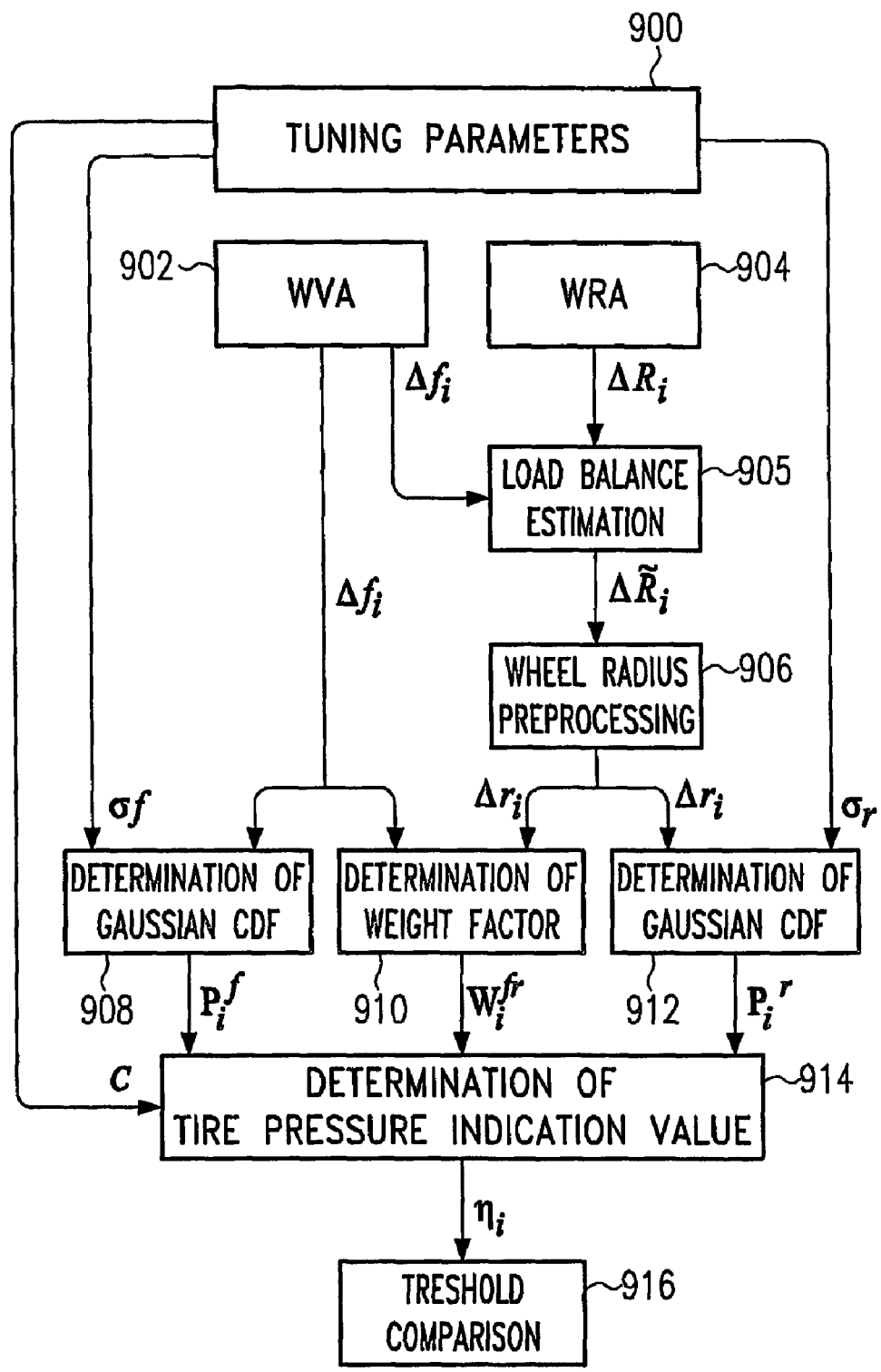
FIG. 9 shows a schematic diagram of a fourth embodiment of the invention.
Figure 10:
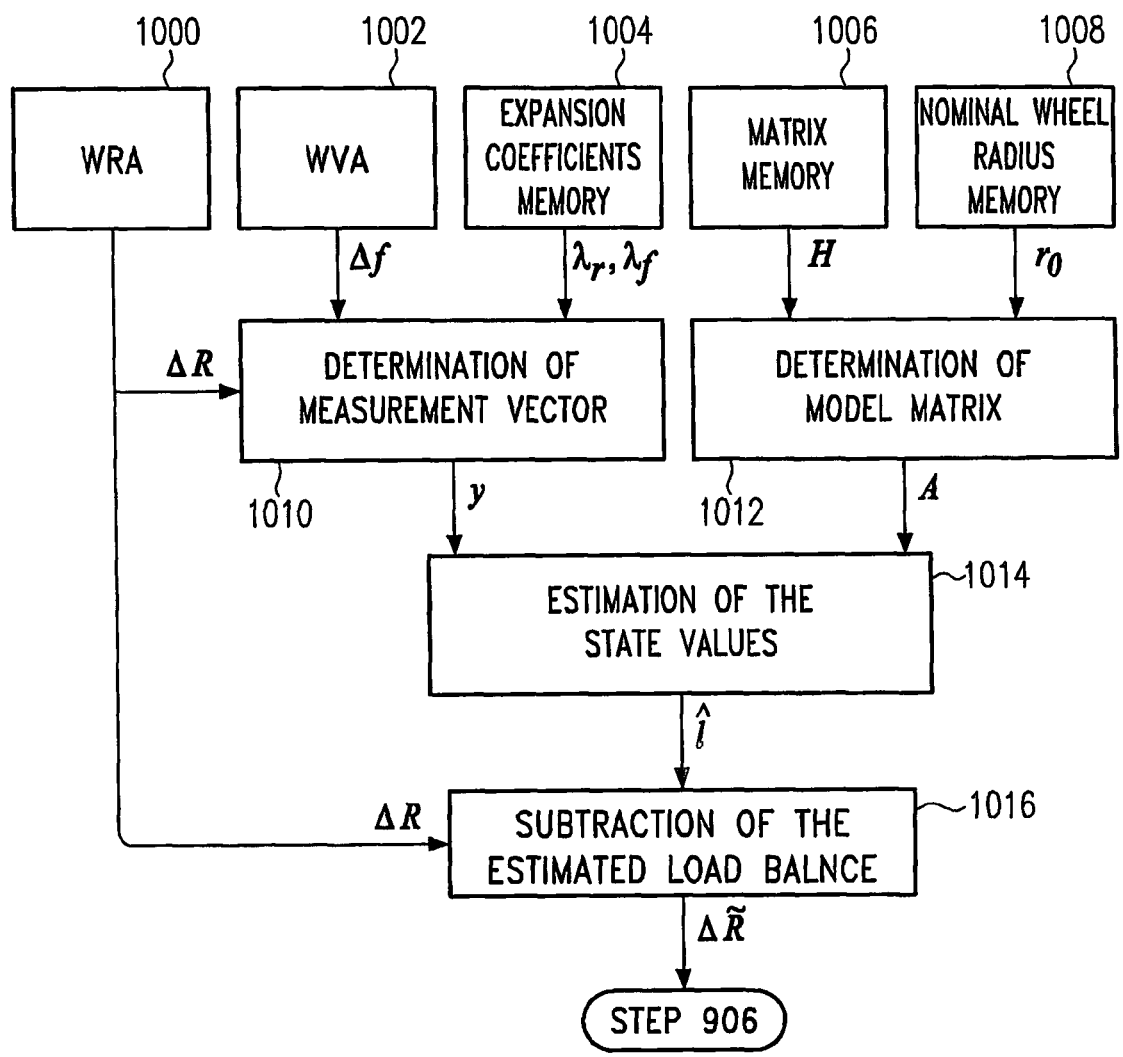
FIG. 10 shows a schematic diagram of a load balance compensation used in the fourth embodiment.

FIG. 9 shows a schematic diagram of a fourth embodiment of the invention. The fourth embodiment corresponds basically to the first embodiment with the exception that it adds prior to the wheel radius preprocessing step 106 of the first embodiment (referenced with the numeral 906 in FIG. 9) a load balance estimation step 905. This load balance estimation step 905 is illustrated in more detail in FIG. 10. It is principally based on the model defined by equation (14b). This model is modified in this embodiment by adding a load balance parameter l as a further component to the vector x which also comprises the current pressure values $\Delta p_i$ to be determined. The load balance parameter l needs to be determined in order to compensate for load changes from the front wheels to the back wheels, and vice versa, during driving of the vehicle. The model matrix A read from the model matrix memory 1006 is modified with regard to the matrix A of equation (14a) in such a way, that the load balance parameter l appropriately influences the wheel radius deviation values $\Delta_{XL}$ and $\Delta_{XR}$. An increase of the value of l corresponds to a load shift to the back wheels whereas a decrease of the value of l corresponds to a load shift to the front wheels.

$$\underbrace{\begin{bmatrix} \Delta R/\lambda_r \\ \Delta f/\lambda_f \end{bmatrix}}_{y} = \underbrace{\begin{bmatrix} \frac{1}{r_0}H & \begin{bmatrix} 0 \\ 1 \\ 1 \\ 0 \end{bmatrix} \\ I & \begin{bmatrix} 0 \\ 0 \\ 0 \\ 0 \end{bmatrix} \end{bmatrix}}_{A} \cdot \underbrace{\begin{bmatrix} \Delta p \\ l \end{bmatrix}}_{x} \quad (21)$$

It should be noted that in contrary to the second embodiment which is based on the modified tire radius values $\Delta\tilde{R}_i$ j (see equation (14a)), the measurement vector y now includes the tire radius values $\Delta R_i$ as obtained from the WRA component 1000 outputting WRA measurement values according to equation (1a).

In order to estimate the state parameters x ($\Delta p_i$ and l) in step 1014, any one of the methods presented in the second and third embodiments can be applied (Least Mean Square estimation as performed in step 516, Kalman filter as applied in step 716). In particular, the Least Mean Square estimate of the load balance parameter l is given as follows:

$$\hat{l} = \frac{1}{2\lambda_r}(\Delta_{XR}+\Delta_{XL}) + \frac{1}{2\lambda_f}(\Delta f_1 + \Delta f_2 - \Delta f_3 - \Delta f_4). \quad (22)$$

A load compensation of the value $\Delta R_i$ can then be obtained by subtracting the load balance estimation value $\hat{l}$ from the corresponding tire radius values $\Delta R_i$ in step 1016:

$$\Delta\tilde{R} = \Delta R - \hat{l}\lambda_r \begin{bmatrix} 0 \\ 1 \\ 1 \\ 0 \end{bmatrix}. \quad (23)$$

Then, further steps 906 to 916 which are identical to the steps 106 to 116 of the first embodiment are performed. A description of theses identical steps is here omitted. Instead, reference is made to the description of the corresponding steps 106 to 116 as shown in FIGS. 1 and 3.

Figure 11:
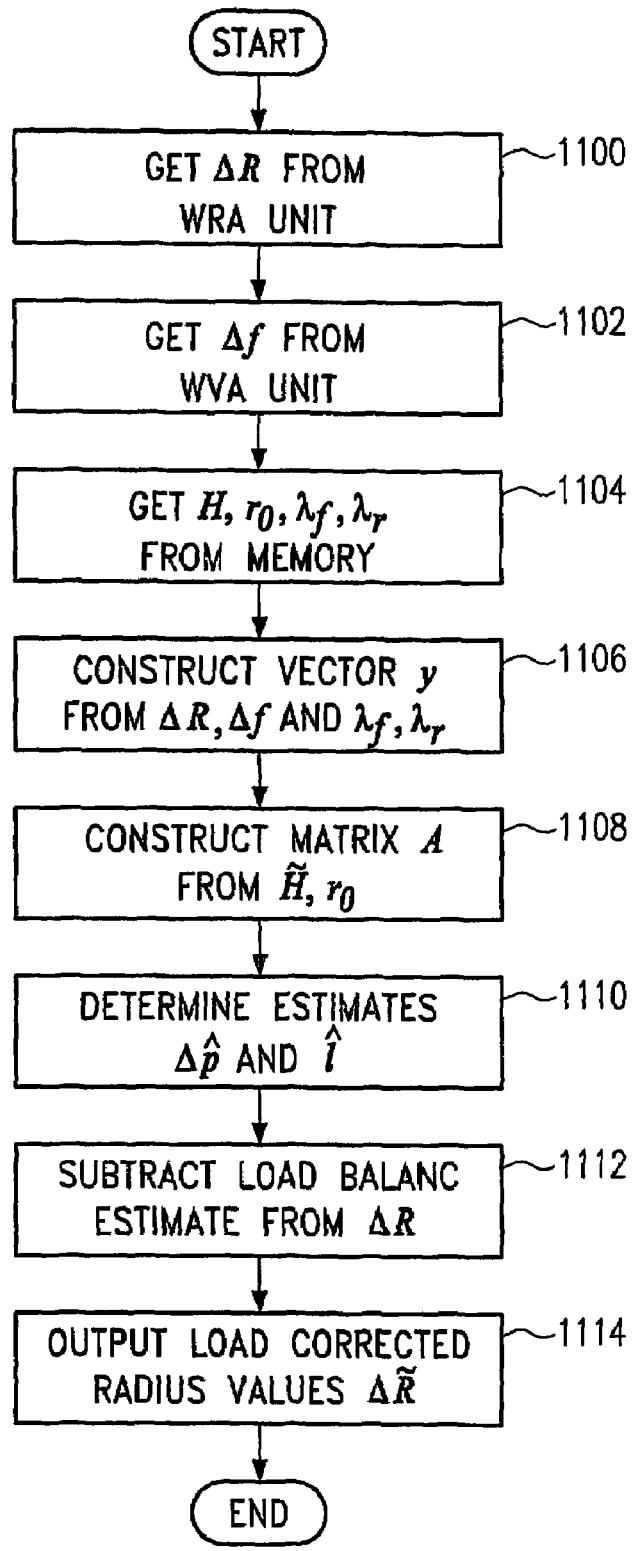
FIG. 11 shows a flow diagram of the process steps of an implementation of the fourth embodiment.
Figure 12A:
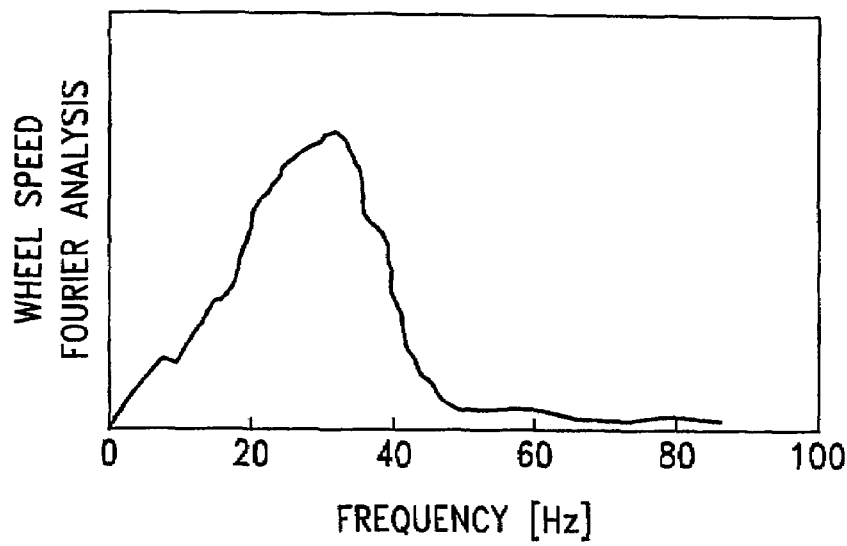
FIGS. 12A, 12B show two power spectra of the rotational velocities which correspond to a low and a high vehicle speed, respectively, according to the prior art.
Figure 12B:
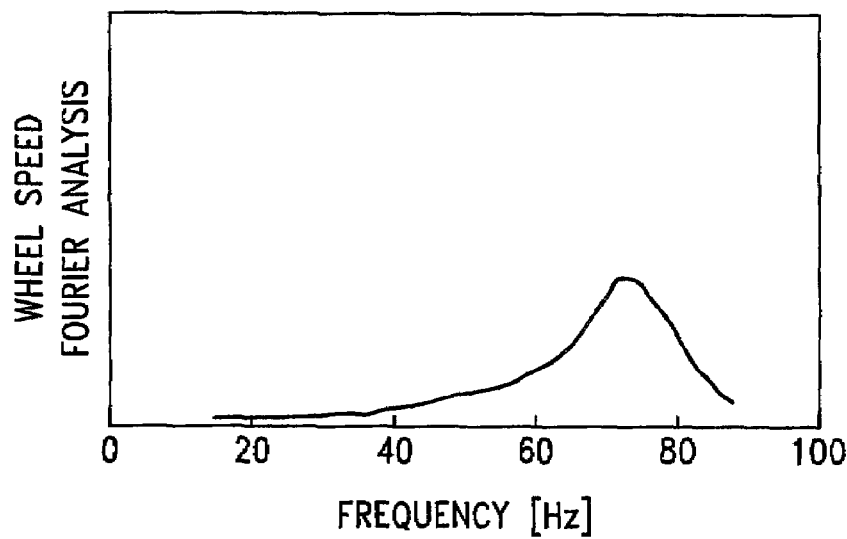
Figure 13:
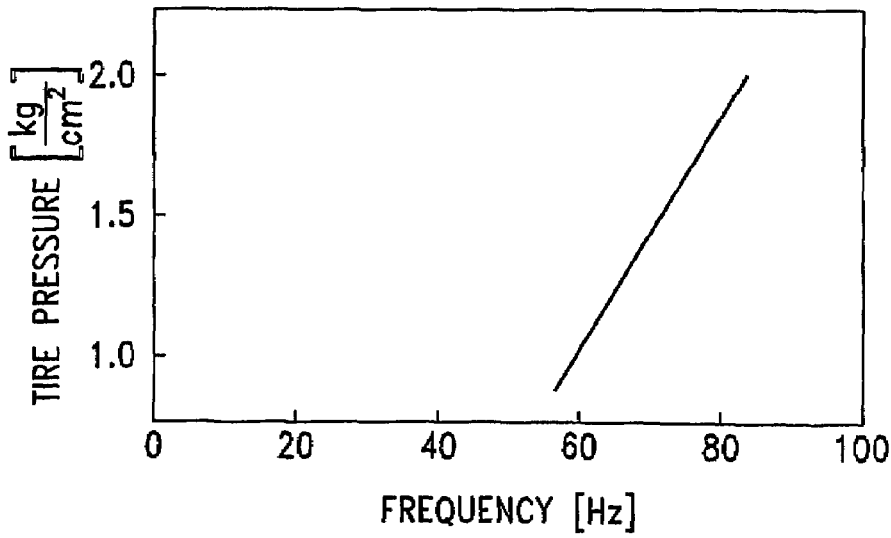
FIG. 13 shows a typical relation of the tire pressure as a function of the resonance frequency according to the prior art.

FIG. 11 shows a flow diagram of the process steps of an implementation of the load balance estimation. In step 1100 and step 1102, wheel radius values $\Delta R_i$ and vibration phenomena values $\Delta f_i$ are obtained from the WRA component and the WVA component, respectively. In step 1104, the matrix H, the nominal wheel radius $r_0$ and the coefficients $\lambda_f$, $\lambda_r$ are fetched from corresponding memories. In step 1106, the measurement vector y is constructed from the wheel radius values $\Delta R_i$ and the vibration phenomena values $\Delta f_i$ and, furthermore, the measurement vector y is normalized with the coefficients $\lambda_f$ and $\lambda_r$. In step 1108, the model matrix A is constructed from the matrix H and the nominal wheel radius $r_0$. In step 1110, the load and pressure deviation parameters l and $\Delta p_i$ are estimated, and by subtracting the estimated load value $\hat{l}$ from the wheel radius values M in step 1112 according to equation (23), the load corrected wheel radius values $\Delta\tilde{R}_i$ are obtained, which are then output in step 1114.

The remaining process steps of this embodiment are identical to the process steps of the first embodiment and it is for this referred to FIG. 3 and the corresponding description.

The load change compensation does not need to be active at all time-instants. It may for example be triggered by a condition like $\Delta_{XL}\cdot\Delta_{XR}>1$ & $\min(|\Delta_{XL}|,|\Delta_{XR}|)>\kappa$ where $\kappa$ is a threshold. Using the above triggering condition, the functionality for single-tire deflations will not be affected at all. For axle-wise deflations, the load compensation method will in principle require that WVA as well as WRA indicate pressure loss before a "tire pressure loss" is issued.

Fifth Embodiment

In contrast to the fourth embodiment which corrects the impact of load changes with an estimated load parameter, the following alternative embodiment for a tire pressure estimation system treats these load changes as a random variable instead of an estimated variable.

Thus, similar to the "upper half" of equation (21), $\Delta R$ may be related to $\Delta p$ and the load balance parameter l according to the following equation by assuming that only $\Delta p$ is a deterministic vector and l is a random variable:

$$(\Delta R/\lambda_r) = \frac{1}{r_0} \cdot H \cdot \Delta p + \begin{bmatrix} 0 \\ 1 \\ 1 \\ 0 \end{bmatrix} l + e \quad (24)$$

where e is a zero-mean Gaussian noise vector reflecting further uncorrelated statistical fluctuations of the tire radii. The noise introduced by the noise vector may be characterized by the following condition: $E\{ee^T\}=\sigma_r^2 I$, where $\sigma_r^2$ is the variance of the random variable e. In addition, it is assumed that the load balance l is a zero-mean Gaussian random variable which is not correlated with e. Thus, $\Delta R/\lambda_r$ is Gaussian distributed with mean $H \cdot \Delta p/r_0$ and the following covariance matrix $Q_{\Delta R}$:

$$Q_{\Delta R} = \sigma_r^2 I + \sigma_l^2 \begin{bmatrix} 0 \\ 1 \\ 1 \\ 0 \end{bmatrix} \begin{bmatrix} 0 \\ 1 \\ 1 \\ 0 \end{bmatrix}^T \quad (25)$$

where $\sigma_l^2$ is the variance of the random variable l.

The covariance matrix $Q_{\Delta R}$ may alternatively be chosen as follows, in particular for rendering the tire pressure estimation system more robust against drifts in the high precision yaw rate (cp. WO 01/87647) due to long curves:

$$Q_{\Delta R} = \sigma_r^2 I + \sigma_l^2 \begin{bmatrix} 0 \\ 1 \\ 1 \\ 0 \end{bmatrix} \begin{bmatrix} 0 \\ 1 \\ 1 \\ 0 \end{bmatrix}^T + \sigma_c^2 \begin{bmatrix} 1 \\ 0 \\ 0 \\ 1 \end{bmatrix} \begin{bmatrix} 1 \\ 0 \\ 0 \\ 1 \end{bmatrix}^T \quad (26)$$

where $\sigma_l^2$ is the variance of the random variable l.

Accordingly, similar to the "lower half" of equation (21), the normalized vibration phenomena vector $\Delta f/\lambda_f$ is Gaussian distributed with mean $\Delta p$ and a covariance matrix $Q_{\Delta f}=\sigma_f^2 I$.

A (Maximum Likelihood) estimate for the pressure value $\Delta p$ may then be obtained from the least squares solution of the following equation:

$$\begin{bmatrix} Q_{\Delta R}^{-1/2}(\Delta R/\lambda_r) \\ Q_{\Delta f}^{-1/2}(\Delta f/\lambda f) \end{bmatrix} = \begin{bmatrix} \frac{1}{r_0} Q_{\Delta R}^{-1/2} H \\ Q_{\Delta f}^{-1/2} \end{bmatrix} \Delta p \quad (27)$$

The estimated pressure value $\Delta \hat{p}$ may be further processed as described in the context of the second embodiment (equation (19)). Hereby, the parameters $\sigma_l^2$, $\sigma_r^2$ and $\sigma_c^2$ may be tuning parameters or statistical parameters (see above).

Sixth Embodiment

In the following, another alternative embodiment is described which relies on the standard $\chi^2$-test. The basic assumption in this embodiment is that under the hypothesis "no deflation of tire i", $\Delta f_i/\sigma_f$ and $\Delta r_i/\sigma_r$ are two zero-mean uncorrelated Gaussian random variables with unit variance, i.e. the sum of $(\Delta f_i/\sigma_f)^2$ and $(\Delta r_i/\sigma_r)^2$ is $\chi^2$-distributed with two degrees of freedom.

Under this assumption, a simple $\chi^2$-based tire pressure estimation system may be based on the following relation:

$$\left(\frac{\Delta f_i}{\sigma_f}\right)^2 + \left(\frac{\Delta r_i}{\sigma_r}\right)^2 > \kappa \quad (28)$$

where, for each wheel i, $\Delta f_i$ is the currently obtained value of the vibration phenomena, $\Delta r_i$ is the currently obtained value of the tire radius (see equation (6)), $\sigma_f$ and $\sigma_r$ are the corresponding standard deviations, and $\kappa$ is a threshold value. Again, the standard deviations $\sigma_f$ and $\sigma_r$ may be predetermined tuning parameters obtained from test drives or "real" statistical magnitudes which are actualized for each newly obtained value for the vibration phenomena and the tire radius. For those skilled in the art, various alternatives for choosing or measuring the standard deviation parameters are easily contemplated, including those with dynamically adapted values.

The threshold parameter $\kappa$ is chosen such that for example a flat tire condition will be detected if equation (28) is fulfilled.

Besides, from $\chi^2$ for tire i (according to the left hand side of equation (28)) a pressure indication value $\eta_i$ (similar to the one obtained in the above embodiments) can be obtained by the $\chi^2$ cumulated distribution function $F(\chi^2, 2)$ for two degrees of freedom $$\eta_i = 1 - F(\chi^2, 2) \quad (29)$$

which is the confidence level for the hypothesis "no deflation of tire i". As an alternative of applying the above threshold value $\kappa$ together with equation (28), the pressure indication value $\eta_i$ obtained in equation (29) may then be treated similarly to the above embodiments.

Seventh Embodiment

Below, an alternative embodiment for the tire pressure estimation system is described. The underlying method is non-parametric in the sense that no specific assumptions are introduced about the statistical distribution of $\Delta f$ and $\Delta r$. Instead, training data are collected during at least one test drive which, under normal drive conditions, are used to evaluate the "no deflation of tire i" hypothesis. The only assumption made is that the single tire pressure estimation for one single tire i can be performed by only considering $\Delta r_i$ and $\Delta f_i$ corresponding to this tire i.

Figure 14:
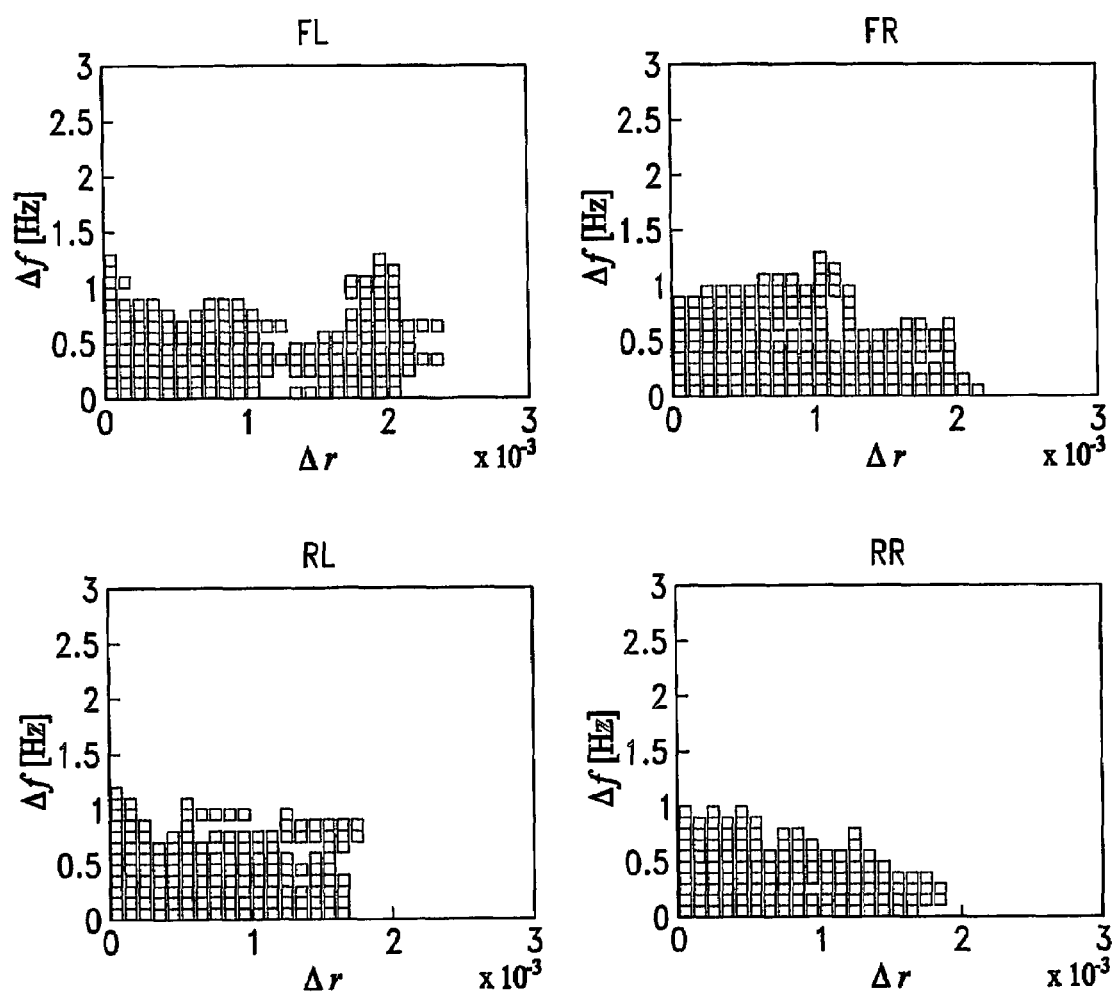
FIG. 14 shows four different graphs, one for each of the four tires, in which ($\Delta f_i$, $\Delta r_i$) parameter pairs obtained for each single tire i are plotted during a test drive under normal single tire conditions.

FIG. 14 shows four different graphs, one for each of the four tires, in which $(\Delta f_i, \Delta r_i)$ parameter pairs obtained for each single tire i are plotted during a test drive under "no deflation of tire i" condition. A box plotted in the graphs of FIG. 14 indicates that this region in the $(\Delta f_i, \Delta r_i)$ parameter space has been "visited", which means that the corresponding $(\Delta f_i, \Delta r_i)$ parameter pair occurred at least once during the recording of the training data. The areas in the graphs of FIG. 14 which are occupied by boxes thus represent the "no deflation of tire i" condition. Consequently, a "deflation of tire i" condition shall only be indicated during normal drive condition for the case that a currently obtained $(\Delta f_i, \Delta r_i)$ parameter pair lies beyond these areas filled with boxes.

A simple tire pressure estimation system can be designed for example by specifying a preferably small number of grid points in the ($\Delta f_i$, $\Delta r_i$) parameter space obtained for each tire i. These grid points are linked together and separate a first area representing the "deflation of tire i" condition from a second area indicating the "no deflation of tire i" condition. The tire pressure estimation system only has to decide if a currently obtained ($\Delta f_i$, $\Delta r_i$) parameter pair lies in the first or second area. This embodiment of a tire pressure estimation system is very cost-effective, in particular due to its low computational complexity. A further advantage is that the process of separating the first and second areas (e.g. by using the above-mentioned grid points, etc.) may be easily automated.

Eighth Embodiment

The following embodiment of a tire pressure estimation system is based on a different approach wherein the vibration phenomena and radius values from the WVA and WRA together with pressure deviation values are measured and collected during a number of real-world driving situations (including cases with "deflation of tire i" and "no deflation of tire i" conditions). For each time instant the following vector may be collected for the vibration phenomena and radius values from the WVA and WRA:

$$\phi(t)=[\Delta R(t)\Delta f(t)]^T. \qquad (30)$$

Furthermore, a general model relating these vectors $\phi(t)$ with the pressure deviation values $\Delta p(t)$ may be established as follows:

$$\Delta p(t)=f(\phi(t),\theta) \qquad (31)$$

where f is an arbitrary function and the generalized variable $\theta$ designates some unknown parameters. One preferable choice for the function f is a series expansion in the vector $\phi(t)$ with expansion parameters $\theta$. For example neural networks, radial basis function networks, and so forth may be used as such a series expansion.

The unknown parameters $\theta$ may then be estimated on the basis of a given function and a collection of N measurements by minimizing the following standard least-squares criterion:

$$\hat{\theta} = \mathrm{argmin}_\theta V_N(\theta) \qquad (32)$$
$$= \mathrm{argmin}_\theta \frac{1}{N}\sum_{i=1}^{N}[\Delta p(t) - f(\varphi(t),\theta)][\Delta p(t) - f(\varphi(t),\theta)]^T$$

where the vectors $\phi(t)$ and the pressure deviation values $\Delta p(t)$ are measured data values, and N designates the number of such measured data values. A decision between a "deflation of tire i" condition and a "no deflation of tire i" condition is finally based on the outputs of the estimated model:

$$\Delta\hat{p}(t)=f(\phi(t),\theta) \qquad (33)$$

For the measured pressure deviation values $\Delta p(t)$, one may use binary values to represent pressure deviations from the nominal pressure, e.g., let $\Delta p_i(t)=0$ represent a non significant pressure drop situation and $\Delta p_i(t)=1$ a significant pressure drop situation in tire i. These binary values may be manually entered into the system by driving under a "no deflation of tire i" condition ($\Delta p_i(t)=0$ will be entered for all measured vectors $\phi(t)$) and under a "deflation of tire i" condition ($\Delta p_i(t)=1$ will be entered for all measured vectors $\phi(t)$). Alternatively, fixed is pressure deviation values $\Delta p(t)$ may be entered where the pressure is changed in a step-like manner. As another alternative, a tire pressure measuring system may be used to enter the measured pressure deviation values $\Delta p(t)$ into the system.

Miscellaneous

According to an exemplified embodiment of the invention, the tire pressure estimating system may be any machine capable of executing a sequence of instructions that specify actions to be taken by that machine for causing the machine to perform any one of the methodologies discussed above. The machine may be an application specified integrated circuit (ASIC) including a processor and a memory unit. The instructions may reside, completely or at least partially, within the memory and/or within the processor.

In particular, the tire pressure estimating system may be implemented in the form of a computer system within which a sequence of instructions may be executed. The computer system may then further include a video display unit, an alpha-numeric input device (e.g. a keyboard), a cursor control device (e.g. a mouse), a disk drive unit. The disk drive unit includes a machine-readable medium on which is stored the sequence of instructions (i.e., a computer program or software) embodying any one, or all, of the methodologies described above.

The computer program product may be a machine-readable medium which is capable of storing or encoding the sequence of instructions for execution by the machine and that cause the machine to perform any one of the methodologies of the present invention. The machine-readable medium shall accordingly be taken to include, but not be limited to, solid-state memories, optical and magnetic disks, and carrier wave signals.

In the above description, for simplification, it is mostly referred to the method case. The system case can be easily derived from the latter one by replacing at the appropriate places in the description the expression 'step' for the method case by the expression 'component' for the system case.

Furthermore, all other publications and existing systems mentioned in this specification are herein incorporated by reference.

Above, various embodiments of the inventions are described within the context of vehicle wheels. However, it is noted that the invention is not limited to vehicle wheels but may include other wheels, as airplane wheels, transport wheels, machine wheels and the like. Furthermore, it is not limited to a particular number of wheels.

The tire pressure estimation system may further comprise detection means for detecting driving on gravel. On gravel the system may be tuned such that it is less sensitive to pressure changes. In principle, only alarms on a single tire may be allowed on gravel.

It is noted that the WRA and WVA components are not limited to the specific WRA and WVA components as described above.

In general, any WRA component may be used which provides single wheel radius values or (linear) combinations thereof. For example, single wheel radius values or combinations thereof may be provided by combining the absolute vehicle velocity with the rotational velocity of a tire. The absolute vehicle velocity may for example be obtained

- by correlating wheel speed signals of front and rear wheels (for more details reference is made to the co-pending application "Determination of a vehicle's absolute velocity" of the same applicant, the content of which is herein incorporated),
- by correlating road surface pictures captured by cameras near the front and rear tires, from navigation system data, from a "fifth" (e.g. non-deformable) wheel, from observations of road markings, from detection of a magnetic tape on the road surface, or from lateral and longitudinal dynamics, etc.

More precisely, in the first mentioned velocity determination of a vehicle having at least one pair of a front and a rear wheel which are spaced by a wheel spacing B, front and rear wheel speed signals are determined which are indicative of the time dependent behavior of the front and rear wheel speeds, respectively. The front and rear wheel speed signals are correlated in order to determine a specific correlation feature indicative of the time delay between the front wheel and rear wheel speed signals. The velocity of the vehicle is determined based on said correlation feature and the wheel spacing. In particular, the action of correlating is based on a correlation function of the front and rear wheel speed signals, wherein said correlation function is a function of a time difference, and the correlation feature is the specific time difference which corresponds to the maximum of said correlation function.

Thereby, the vehicle velocity is computed from the specific time difference. For example, the correlation function $R_{13}(\tau)$ for the front-left and the rear left wheel may be defined as $$R_{13}(\tau)=E[(\omega_1(t)-E(\omega_1(t)))(\omega_3(t-\tau)-E(\omega_3(t-\tau)))]. \quad (34)$$

with $\omega_i(t)$ denoting the wheel speed signal of the respective wheel i, $E(\omega(t))$ denoting the expectation value of $\omega(t)$, and $\tau$ denoting the time delay. Small disturbances injected by uneven road surface will occur first on $\omega(t)$ and $B/v_1$ seconds later on $\omega_3(t)$. Here $v_1$ denotes the velocity of the car. The correlation function $R_{13}(\tau)$ is a function of time delay $\tau$ and will show a peak at $$\tau = \frac{B}{v_l} \quad (35)$$

When driving with constant speed, one can directly obtain $R_{13}(\tau)$. The time delay is obtained from $R_{13}(\tau T)$ by $\hat{\tau}$=arg max $R_{13}(\tau)$. Inserting the obtained $\hat{\tau}$ in equation (35) then yields the absolute velocity of the car.

Alternatively, the action of correlating comprises a compensation with a wheel speed signal of the front or the rear wheel such that the correlation feature remains unchanged with varying vehicle velocity but changes with varying wheel radius of the respective wheel. Hereby, a correlation function of the front and rear wheel speed signals is applied which is a function of the reciprocal of the product of the known wheel speed signal and the respective unknown wheel radius. Then, the correlation feature is the specific wheel radius which corresponds to the maximum of the correlation function, whereby the vehicle velocity is computed from the specific wheel radius and the corresponding wheel speed signal. In detail, using the relation $\tau=B/\omega_i r_i$ and defining $x=B/r_i$ in equation (34) results in a velocity compensated correlation function $$\bar{R}_{13}(x)=E(\omega_1(t)-E(\omega_1(t)))(\omega_3(t-x/\omega_1(t))-E(\omega_3(t-x/\omega_1(t)))). \quad (36)$$

By maximizing $\bar{R}_{13}(x)$ with respect to the variable $x=B/r_1$ one can obtain an estimation value $\hat{r}_1$ for the wheel radius of the front-left wheel $$\hat{r}_1 = \arg\min_\tau \bar{R}_{13}\left(\frac{B}{r}\right).$$

Analogously, this allows to estimate all wheel radii $r_i$ of the vehicle even at rapidly varying vehicle velocities. From these wheel radii $r_i$, the absolute velocity $v_i=\omega_i r_i$ at each wheel can be determined and simple geometrical transformations can be used to find the velocity at any position of the vehicle. Naturally, the wheel radii $r_i$ thus determined may be directly used for a combination with the wheel vibration data values.

Alternatively, the correlation feature is obtained by Fourier transforming the wheel speed signals to obtain Fourier transformed wheel speed signals and calculating a phase function of the ratio of the Fourier transformed wheel speed signals of the front and the rear wheel. Thereby, the slope of said phase function is the correlation feature indicative of the time delay. In detail, Fourier transforming the wheel speed signals $\omega_i(t)$ with standard FFT-methods results in corresponding Fourier coefficients $\Omega_i(f)$. A time shift of $\tau$ of the wheel speed signals in the time domain $\omega(t) \rightarrow \omega(t-\tau)$ corresponds to a phase shift $\Omega(f) \rightarrow \Omega(f)e^{-i2\pi f\tau}$ in the frequency domain. One approach is to adjust a straight line to the phase curve of $\Omega_1(f)/\Omega_3(f)$ which should have a slope $2\pi\tau$.

Similarly, the WVA component could be any component which provides wheel vibration data values, for example by using microphones for recording driving noise near the vehicle wheels, accelerometers for measuring vehicle vibrations, or wheel suspension sensors, etc.

Other input signals can also be used in the tire pressure estimating system for load compensation. Any signal that measures the weight on a wheel or the entire vehicle may be contemplated, such as wheel suspension, trailer-sensor, estimator of physical mass etc.

Although certain methods, systems and products constructed in accordance with the teachings of the invention have been described herein, the scope of coverage of this patent is not is limited thereto. On the contrary, this patent covers all embodiments of the teachings of the invention fairly falling within the scope of the appended claims either literally or under the doctrine of equivalents.

The invention claimed is:

1. A method for estimating the occurrence of a specific tire pressure deviation between actual and nominal pressure values for one or a plurality of wheels (i), comprising the following steps:
   a) subsequently obtaining one or more wheel radius analysis measurement values ($\Delta R$) from a wheel radius analysis component (104), wherein the wheel radius analysis measurement values ($\Delta R$) are related to single wheel radius values ($\Delta r_i$) of which each is indicative of the wheel radius of a particular wheel (i);
   b) subsequently obtaining one or more wheel vibration data values ($\Delta f_i$) from a wheel vibration analysis component (102), wherein each of the wheel vibration data values ($\Delta f_i$) is indicative of a vibration phenomena in the time dependent behavior of the rotational velocity of a particular wheel (i); and
   c) calculating one or more tire pressure output values ($\eta_i, \Delta p_i$) on the basis of both the wheel radius analysis measurement values ($\Delta R$) and the wheel vibration data values ($\Delta f_i$) wherein each tire pressure output value ($\eta_i, \Delta p_i$) is indicative of the specific tire pressure deviation for a particular wheel (i).

2. The method of claim 1, wherein the calculation of the tire pressure output value ($\eta_i$) for each wheel (i) comprises the following:
calculating a first probability value ($P_i^f$) from the wheel vibration data value ($\Delta f_i$) which is indicative of the statistical significance of the deviation of the wheel vibration data value ($\Delta f_i$) from a nominal wheel vibration value;
calculating a second probability value ($P_i^r$) from the wheel radius analysis measurement values ($\Delta R$) which is indicative of the statistical significance of the deviation of the single wheel radius values ($\Delta r_i$) from a nominal wheel radius value; and
calculating the tire pressure output value ($\eta_i$) from the first and second probability values ($P_i^f, P_i^r$).

3. The method of claim 2, wherein the first and second probability values ($P_i^f, P_i^r$) are cumulative probability distribution function values; and the tire pressure output value ($\eta_i$) is based on the product of the first and second cumulative probability distribution function values ($P_i^f, P_i^r$).

4. The method of claim 3, wherein the first and second cumulative probability distribution function values ($P_i^f, P_i^r$) are Gaussian cumulative probability distribution function values; and the calculation of the first and second probability values ($P_i^f, P_i^r$) is further based on a first and a second standard deviation parameter ($\sigma_f, \sigma_r$), respectively.

5. The method of claim 4, wherein the product of the first and second cumulative probability distribution function value ($P_i^f, P_i^r$) is further multiplied with a weight factor ($W_i^{fr}$), which is calculated on the basis of the wheel vibration data value ($\Delta f_i$), the wheel radius analysis measurement values ($\Delta R$) or the single wheel radius values ($\Delta r_i$), and of standard deviation parameters ($\sigma_f, \sigma_r$).

6. The method of claim 5, wherein the weight factor $w_i^{fr}$ is calculated as follows:

$$W_i^{fr} = \exp\left(\sigma_1 \left| \frac{\Delta f_i}{\sigma_f} - \frac{\Delta r_i}{\sigma_r} \right|\right) \cdot \exp\left(\sigma_2 \left| \frac{\Delta f_i \Delta r_i}{\delta_f \sigma_r} \right|\right),$$

wherein $\Delta f_i$ is the wheel vibration data value, $\Delta r_i$ is the single wheel radius value, $\sigma_f$ and $\sigma_r$ are standard deviation parameters, and $\sigma_1$ and $\sigma_2$ are tuning parameters.

7. The method of claim 5, wherein the weight factor $W_i^{fr}$ is calculated as follows:

$$W_i^{fr} = \exp\left(\sigma \left| \frac{\Delta f_i \Delta r_i}{\sigma_f \sigma_r} \right|\right),$$

wherein $\Delta f_i$ is the wheel vibration data value, $\Delta r_i$ is the single wheel radius value, $\sigma_f$ and $\sigma_r$ are standard deviation parameters, and $\sigma$ is a tuning parameters.

8. The method of claim 1, wherein the calculation of the tire pressure output value ($\Delta p_i$) is based on a model assuming a linear relationship between on the one hand the wheel vibration data and the wheel radius analysis measurement values ($\Delta f_i, \Delta R$) and on the other hand the tire pressure output value ($\Delta p_i$).

9. The method of claim 8, wherein the tire pressure output value ($\Delta p_i$) is calculated from the wheel vibration data and the wheel radius analysis measurement values ($\Delta f_i, \Delta R$) by a Least Mean Square method (516).

10. The method of claim 8, wherein the pressure deviation value ($\Delta p_i$) is calculated from the wheel vibration data and the wheel radius analysis measurement values ($\Delta f_i, \Delta R$) by an adaptive filter (716).

11. The method of claim 10, wherein the adaptive filter (716) is a Kalman filter.

12. The method of claim 1, wherein the wheel radius analysis measurement values ($\Delta R$) are transformed to modified wheel radius values ($\Delta \tilde{R}$) which are less sensitive to load changes on the plurality of wheels (i).

13. The method of claim 1, which comprises the following steps:
calculating a load balance value (l) on the basis of the wheel vibration data and the wheel radius analysis measurement values ($\Delta f_i, \Delta R$) which is indicative of a load balance on the plurality of wheels (i);
calculating load balance corrected wheel radius analysis measurement values ($\Delta \tilde{R}$) on the basis of the wheel radius analysis measurement values ($\Delta R$) and the estimated load balance value (l).

14. The method of claim 13, wherein the calculation of the load balance value (l) is based on a model assuming a linear relationship between on the one hand the wheel vibration data and the wheel radius analysis measurement values ($\Delta f_i, \Delta R$) and on the other hand the tire pressure output values ($\Delta p_i$) and the load balance value (l).

15. The method of claim 14, wherein the load balance value (l) is calculated from the wheel vibration data and the wheel radius analysis measurement values ($\Delta f_i, \Delta R$) by a Least Mean Square method (104).

16. The method of claim 14, wherein the load balance value (l) is calculated from the wheel vibration data and the wheel radius analysis measurement values ($\Delta f_i, \Delta R$) by an adaptive filter (1014).

17. The method of claim 16, wherein the adaptive filter (1014) is a Kalman filter.

18. The method of claim 1, which comprises the following steps:
collecting data value pairs consisting of a single wheel radius data value ($\Delta r_i$) and a wheel vibration data value ($\Delta f_i$) during test drives,
defining an area which comprises the collected data value pairs, and
calculating the tire pressure output value by testing whether an actual data value pair obtained during normal drives lies within the defined area or not.

19. The method of claim 1, wherein the tire pressure output value is calculated on the basis of a $\chi^2$-test from the single wheel radius data values ($\Delta r_i$) and the wheel vibration data values ($\Delta f_i$).

20. The method of claim 1, wherein the calculation of the tire pressure output value ($\Delta p_i$) is based on a model assuming a linear relationship between on the one hand the wheel vibration data and the wheel radius analysis measurement values ($\Delta f_i, \Delta R$) and on the other hand the tire pressure output value ($\Delta p_i$) and a load balance value (l), wherein the load balance value (l) is treated as a random variable and the tire pressure output value ($\Delta p_i$) is calculated by a Least Square method from the model.

21. The method of claim 1, wherein the calculation of the tire pressure output value ($\Delta p_i$) is based on a specific function relating the tire pressure output value ($\Delta p_i$) with the wheel vibration data values ($\Delta f_i$), the wheel radius analysis measurement values ($\Delta R$) and further parameters, wherein the further parameters are determined during test drives by a Least Square method on the basis of the specific function, obtained tire pressure output values ($\Delta p_i$), obtained wheel vibration data values ($\Delta f_i$) and corresponding tire pressure values.

22. The method of claim 21, wherein the specific function is a series expansion in the wheel vibration data values ($\Delta f_i$) and the wheel radius analysis measurement values ($\Delta R$).

23. The method of claim 21, wherein the series expansion is established by a neural network or a radial basis function network.

24. The method of claim 1, wherein each of the wheel radius analysis measurement values either corresponds to a single wheel radius value or to a linear combination of single wheel radius values.

25. The method of claim 1, wherein the vibration phenomena comprises spectral properties in the time dependent behavior of the rotational velocity of a particular wheel (i).

26. A system for estimating the occurrence of a specific tire pressure deviation between actual and nominal pressure values for one or a plurality of wheels (i), comprising:
   a) a first component for subsequently obtaining one or more wheel radius analysis measurement values ($\Delta R$) from a wheel radius analysis component (104), wherein the wheel radius analysis measurement values ($\Delta R$) are related to single wheel radius values ($\Delta r_i$) of which each is indicative of the wheel radius of a particular wheel (i);
   b) a second component for subsequently obtaining one or more wheel vibration data values ($\Delta f_i$) from a wheel vibration analysis component (102), wherein each of the wheel vibration data values ($\Delta f_i$) is indicative of a vibration phenomena in the time dependent behavior of the rotational velocity of a particular wheel (i); and
   c) a third component for calculating one or more tire pressure output values ($\eta_i, \Delta p_i$) on the basis of both the wheel radius analysis measurement values ($\Delta R$) and the wheel vibration data values ($\Delta f_i$) wherein each tire pressure output value ($\eta_i, \Delta p_i$) is indicative of the specific tire pressure deviation for a particular wheel (i).

27. A computer program product including program code for carrying out a digital signal processing method, when executed on a computer system, for estimating the occurrence of a specific tire pressure deviation between actual and nominal pressure values for one or a plurality of wheels (i), comprising the following steps:
   a) subsequently obtaining one or more wheel radius analysis measurement values ($\Delta R$) from a wheel radius analysis component (104), wherein the wheel radius analysis measurement values ($\Delta R$) are related to single wheel radius values ($\Delta r_i$) of which each is indicative of the wheel radius of a particular wheel (i);
   b) subsequently obtaining one or more wheel vibration data values ($\Delta f_i$) from a wheel vibration analysis component (102), wherein each of the wheel vibration data values ($\Delta f_i$) is indicative of a vibration phenomena in the time dependent behavior of the rotational velocity of a particular wheel (i); and
   c) calculating one or more tire pressure output values ($\eta_i, \Delta p_i$) on the basis of both the wheel radius analysis measurement values ($\Delta R$) and the wheel vibration data values ($\Delta f_i$) wherein each tire pressure output value ($\eta_i, \Delta p_i$) is indicative of the specific tire pressure deviation for a particular wheel (i).

* * * * *

UNITED STATES PATENT AND TRADEMARK OFFICE
CERTIFICATE OF CORRECTION

PATENT NO. : 7,263,458 B2  Page 1 of 1
APPLICATION NO. : 10/563524
DATED : August 28, 2007
INVENTOR(S) : Hall et al.

It is certified that error appears in the above-identified patent and that said Letters Patent is hereby corrected as shown below:

Title page, [75] inventors should read as follows:

Tony Gustavsson
    Askim (SE)

Fredrik Gustavsson
    Linköping (SE)

Signed and Sealed this

First Day of July, 2008

JON W. DUDAS
*Director of the United States Patent and Trademark Office*